(12) United States Patent
Sugiyama et al.

(10) Patent No.: US 10,746,838 B2
(45) Date of Patent: Aug. 18, 2020

(54) SIGNAL PROCESSING APPARATUS, SIGNAL PROCESSING METHOD, AND SIGNAL PROCESSING PROGRAM

(71) Applicants: NEC Corporation, Minato-ku, Tokyo (JP); NEC Engineering, Ltd., Kawasaki-shi, Kanagawa (JP)

(72) Inventors: Akihiko Sugiyama, Tokyo (JP); Ryoji Miyahara, Kanagawa (JP)

(73) Assignee: NEC CORPORATION, Tokyo (JP)

( * ) Notice: Subject to any disclaimer, the term of this patent is extended or adjusted under 35 U.S.C. 154(b) by 304 days.

(21) Appl. No.: 15/523,428

(22) PCT Filed: Nov. 6, 2015

(86) PCT No.: PCT/JP2015/081386
§ 371 (c)(1),
(2) Date: May 1, 2017

(87) PCT Pub. No.: WO2016/076237
PCT Pub. Date: May 19, 2016

(65) Prior Publication Data
US 2017/0307721 A1 Oct. 26, 2017

(30) Foreign Application Priority Data
Nov. 10, 2014 (JP) ................................. 2014-228497

(51) Int. Cl.
*G01S 3/808* (2006.01)
*G10L 25/51* (2013.01)
(Continued)

(52) U.S. Cl.
CPC .......... *G01S 3/808* (2013.01); *G10L 21/0224* (2013.01); *G10L 21/0272* (2013.01);
(Continued)

(58) Field of Classification Search
CPC . G01S 3/808; G10L 21/0224; G10L 21/0272; G10L 25/51; G10L 2021/02166;
(Continued)

(56) References Cited

U.S. PATENT DOCUMENTS

| 5,581,620 A | 12/1996 | Brandstein et al. |
| 2007/0050441 A1* | 3/2007 | Taenzer ................. H04R 3/005 708/446 |

(Continued)

FOREIGN PATENT DOCUMENTS

| JP | 9140000 A | 5/1997 |
| JP | 9512676 A | 12/1997 |

(Continued)

OTHER PUBLICATIONS

Jingzhou et al., "End-fire microphone array based on phase difference enhancement algorithm", 2010, IEEE 10th International Conference on Signal Processing Proceedings, pp. 486-489. (Year: 2010).*

(Continued)

*Primary Examiner* — Davetta W Goins
*Assistant Examiner* — Daniel R Sellers

(57) ABSTRACT

A wideband signal is enhanced or suppressed to the same extent at each frequency without increasing the size of an overall sensor array. To achieve this, there is provided a signal processing apparatus including a direction estimator that obtains a direction of arrival of a signal for signals received from a plurality of sensors and each containing a target signal and noise, a first gain calculator that calculates a first gain using the direction of arrival of the signal, an integrator that obtains an integrated signal by integrating the signals received from the plurality of sensors, and a multiplier that multiplies the first gain by the integrated signal.

19 Claims, 26 Drawing Sheets

(51) Int. Cl.
  *H04R 1/40* (2006.01)
  *H04R 3/00* (2006.01)
  *G10L 21/0224* (2013.01)
  *G10L 21/0272* (2013.01)
  *G10L 21/0216* (2013.01)

(52) U.S. Cl.
  CPC .............. *G10L 25/51* (2013.01); *H04R 1/40* (2013.01); *G10L 2021/02166* (2013.01); *H04R 1/406* (2013.01); *H04R 3/005* (2013.01); *H04R 2201/403* (2013.01); *H04R 2430/03* (2013.01); *H04R 2430/20* (2013.01); *H04R 2499/11* (2013.01)

(58) Field of Classification Search
  CPC .......... H04R 1/40; H04R 1/406; H04R 3/005; H04R 2201/40; H04R 2201/401; H04R 2201/403; H04R 2201/405; H04R 2430/03; H04R 2430/20; H04R 2430/21; H04R 2430/23; H04R 2430/25; H04R 2499/11; H04R 2203/12
  USPC ........................................................... 381/92
  See application file for complete search history.

(56) References Cited

U.S. PATENT DOCUMENTS

| | | |
|---|---|---|
| 2013/0064392 A1 | 3/2013 | Sugiyama |
| 2014/0185826 A1 | 7/2014 | Tawada |

FOREIGN PATENT DOCUMENTS

| | | |
|---|---|---|
| JP | 2011119898 A | 6/2011 |
| JP | 2013250356 A | 12/2013 |
| JP | 2014-128013 A | 7/2014 |

OTHER PUBLICATIONS

Lloyd J. Griffiths et al. "An Alternative Approach to Linearly Constrained Adaptive Beamforming," IEEE Transactions on Antennas and Propagations, vol. 30, No. 1,, Jan. 1982 (pp. 27-34).

Osamu Hoshuyama et al. "Robust Adaptive Beamforming" Microphone Arrays, Springer, Berlin Heidelberg New York, vol. 5 2001 (23 pages total).

J.L Flanagan et al. "Computer-steered microphone arrays for sound transduction in large rooms" The Journal of the Acoustical Society of America; vol. 78 1985 (12 pages).

Thomas Chou "Frequency-Independent Beamformer With Low Response Error" IEEE Proceedings of International Conference on Acoustics, Speech, and Signal Processing, vol. V, pp. 2995-2998, May 1995.

Zicheng Liu et al. Energy-Based Sound Source Localization and Gain Normalization for Ad Hoc Microphone Arrays IEEE Proceedings of International Conference on Acoustics, Speech, and Signal Processing, vol. 2 Apr. 2007(pp. 761-764).

Jacob Benesty et al. "Springer Handbook of speech processing" 2008 (77 pages total).

Jalal Taghia et al. "An evaluation of Noise Power Spectral Density Estimation Algorithms in Adverse Acoustic Environments" IEEE Proceedings of International Conference on Acoustics, Speech, and Signal Processing, pp. 4640-4643, May 2011.

International Search Report, issued by International Searching Authority in corresponding International Application No. PCT/JP2015/081386, dated Dec. 8, 2015.

Japanese Office Action for JP Application No. 2016-559026 dated Jan. 7, 2020 with English Translation.

* cited by examiner

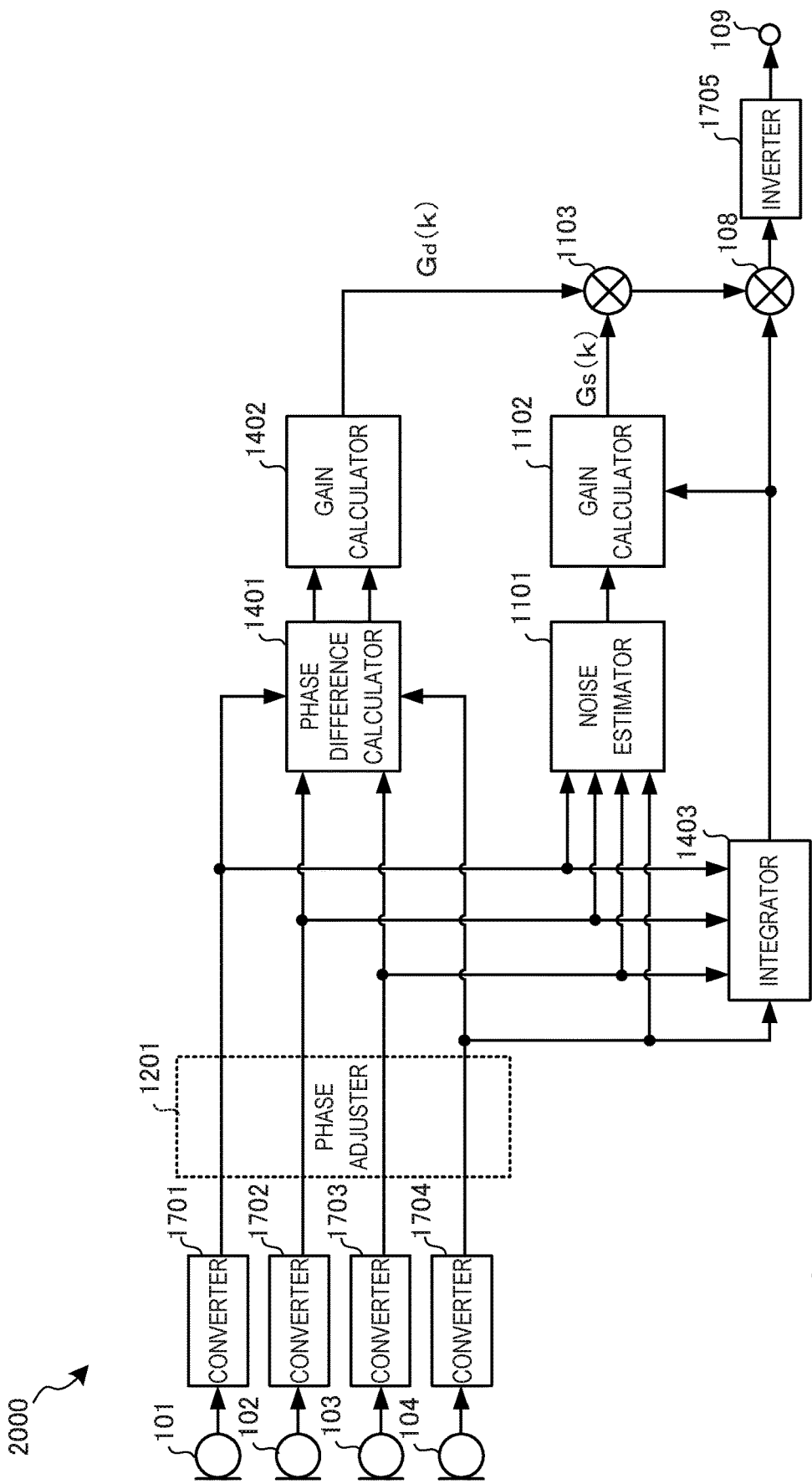
F I G. 20

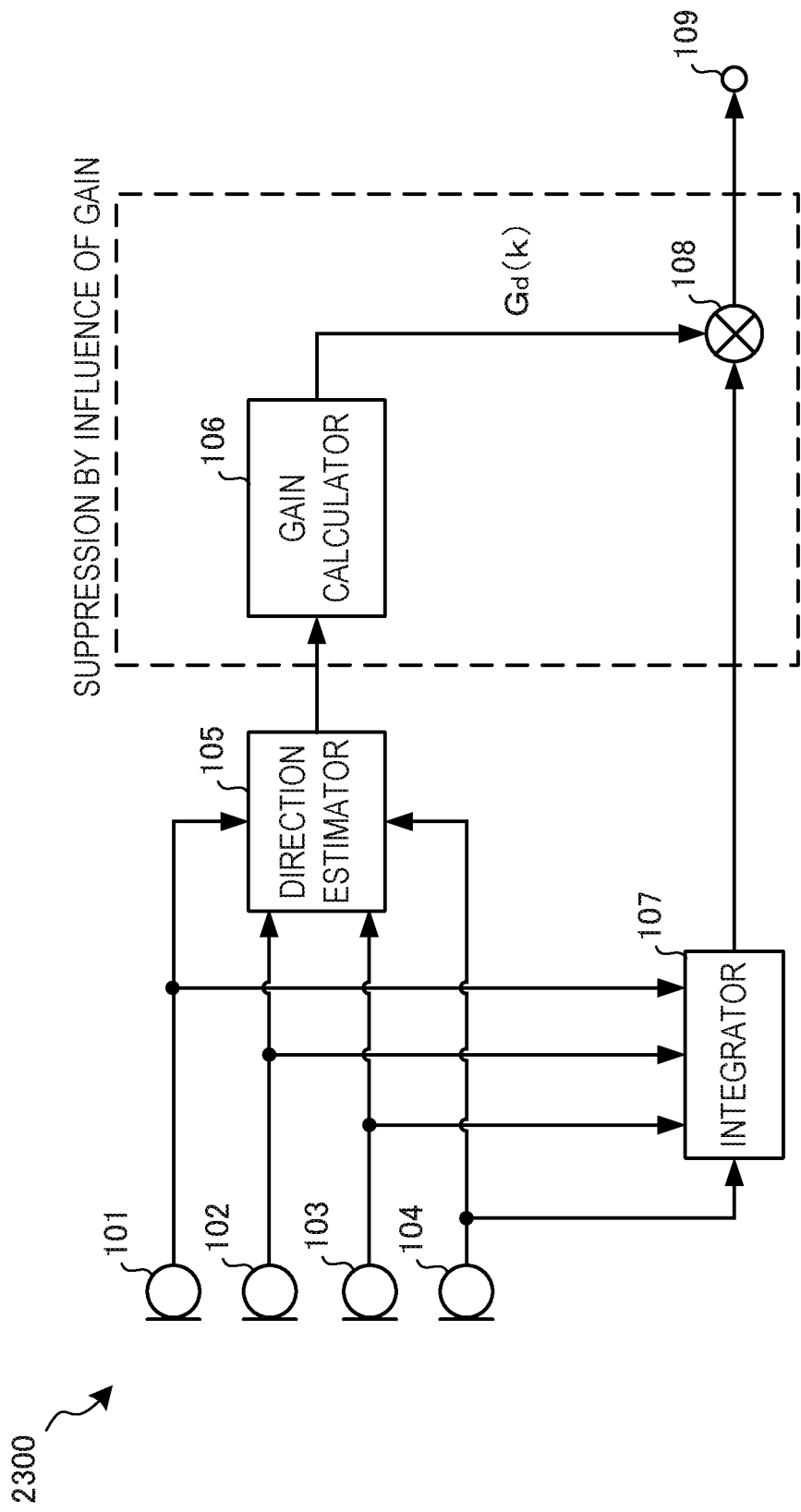
F I G. 23

SIGNAL PROCESSING APPARATUS, SIGNAL PROCESSING METHOD, AND SIGNAL PROCESSING PROGRAM

This application is a National Stage Entry of PCT/JP2015/081386 filed on Nov. 6, 2015, which claims priority from Japanese Patent Application 2014-228497 filed on Nov. 10, 2014, the contents of all of which are incorporated herein by reference, in their entirety.

TECHNICAL FIELD

The present invention relates to a technique of enhancing or suppressing a signal using directivity formed by a plurality of sensors.

BACKGROUND ART

In the above technical field, non-patent literatures 1 and 2 disclose techniques of enhancing a target signal and suppressing an interfering signal by processing a plurality of sensor signals to generate an enhanced target signal, suppressing the target signal to generate a pseudo interfering signal in which an interfering signal is relatively enhanced, and subtracting a component correlated with the pseudo interfering signal from the enhanced target signal.

In these techniques, directivity is formed using a phase difference between signals based on a difference in spatial position between a plurality of sensors, and a specific signal is enhanced or suppressed based on the formed directivity.

Furthermore, non-patent literatures 3 and 4 describe arrangements obtained by combining the techniques of non-patent literatures 1 and 2 in a plurality of frequency bands from a low band to a high band using a plurality of arrays with different sensor intervals.

CITATION LIST

Patent Literature

Patent literature 1: U.S. Patent Application Publication No. 2013/0064392A1

Non-Patent Literature

Non-patent literature 1: IEEE TRANSACTIONS ON ANTENNAS AND PROPAGATIONS, VOL. 30, NO. 1, PP. 27-34, January 1982
Non-patent literature 2: CH. 5, MICROPHONE ARRAYS, SPRINGER, BERLIN HEIDELBERG NEW YORK, 2001
Non-patent literature 3: JOURNAL OF ACOUSTICAL SOCIETY OF AMERICA, VOL. 78, No. 5, PP. 1508-1518, May 1985
Non-patent literature 4: IEEE PROCEEDINGS OF INTERNATIONAL CONFERENCE ON ACOUSTICS, SPEECH, AND SIGNAL PROCESSING, VOL. V, PP. 2995-2998, May 1995
Non-patent literature 5: IEEE PROCEEDINGS OF INTERNATIONAL CONFERENCE ON ACOUSTICS, SPEECH, AND SIGNAL PROCESSING, VOL. 2, PP. 761-764, APRIL 2007
Non-patent literature 6: HANDBOOK OF SPEECH PROCESSING, SPRINGER, BERLIN HEIDELBERG NEW YORK, 2008
Non-patent literature 7: IEEE PROCEEDINGS OF INTERNATIONAL CONFERENCE ON ACOUSTICS, SPEECH, AND SIGNAL PROCESSING, PP. 4640-4643, MAY 2011

SUMMARY OF THE INVENTION

Technical Problem

In the techniques described in the above non-patent literatures 1 and 2, however, sufficient directivity cannot be formed with respect to a low-frequency signal component. This is because if a sensor common to medium and high frequencies is used at a low frequency at which a wavelength is longer than those at the medium and high frequencies, a sensor interval which is relatively narrow cannot generate a sufficiently large signal phase difference between signals at a plurality of sensors. In the techniques described in non-patent literatures 3 and 4, an increase in cost caused by the increased number of sensors and an increase in array size caused by a wide sensor interval corresponding to the low band pose problems.

These techniques described in the literatures cannot uniformly enhance or suppress a signal in a wide frequency band without increasing the size of the sensor array or the number of sensors.

The present invention enables to provide a technique of solving the above-described problems.

Solution to Problem

One aspect of the present invention provides a signal processing apparatus characterized by comprising:
a direction estimator that obtains a direction of arrival (DOA) of a signal for signals received from a plurality of sensors and each containing a target signal and noise;
a first gain calculator that calculates a first gain using the direction of arrival of the signal;
an integrator that obtains an integrated signal by integrating the signals received from the plurality of sensors; and
a first multiplier that multiplies the first gain by the integrated signal.

Another aspect of the present invention provides a signal processing apparatus characterized by comprising:
a first phase difference calculator that obtains a phase difference between two signals received from two adjacent sensors among a plurality of sensors each for inputting a signal containing a target signal and noise;
a second gain calculator that calculates a second gain using the phase difference;
an integrator that obtains an integrated signal by integrating signals received from the plurality of sensors; and
a first multiplier that multiplies the second gain by the integrated signal.

Still other aspect of the present invention provides a method characterized by comprising:
obtaining a direction of arrival of a signal for signals received from a plurality of sensors and each containing a target signal and noise;
calculating a first gain using the direction of arrival of the signal;
obtaining an integrated signal by integrating the signals received from the plurality of sensors; and
multiplying the first gain by the integrated signal.

Still other aspect of the present invention provides a signal processing program for causing a computer to execute a method, characterized by comprising:

obtaining a direction of arrival of a signal for signals received from a plurality of sensors and each containing a target signal and noise;

calculating a first gain using the direction of arrival of the signal;

obtaining an integrated signal by integrating the signals received from the plurality of sensors; and multiplying the first gain by the integrated signal.

Advantageous Effects of Invention

According to the present invention, it is possible to enhance or suppress a wideband signal to the same extent at each frequency without increasing the size of a sensor array. That is, it is possible to process an array having an equal beam or null width in a wide frequency band.

BRIEF DESCRIPTION OF DRAWINGS

FIG. 20 is a block diagram showing the arrangement of a signal processing apparatus according to the 15th example embodiment of the present invention;

FIG. 23 is a block diagram showing an example of the arrangement of a signal processing apparatus according to the 16th example embodiment of the present invention;

DESCRIPTION OF EXAMPLE EMBODIMENTS

Example embodiments of the present invention will now be described in detail with reference to the drawings. It should be noted that the relative arrangement of the components, the numerical expressions and numerical values set forth in these example embodiments do not limit the scope of the present invention unless it is specifically stated otherwise. Note that "speech signal" in the following explanation indicates a direct electrical change that occurs in accordance with speech or another sound. The speech signal transmits speech or another sound and is not limited to speech. An example in which the number of sensors is four will be described. However, this is merely an example, and the same applies to an arbitrary number of two or more sensors. Furthermore, an example in which a plurality of sensors are arranged on the same straight line at equal intervals will be described. However, a sensor arrangement in which sensors are not arranged on the same straight line or sensors arranged at unequal intervals can be discussed, as will be described later, by correcting a spatial position shift in terms of an amplitude and phase. Examples of the sensor arrangement in which sensors are not arranged on the same straight line are an arc-shaped arrangement, a circular arrangement, and a completely free space arrangement. Especially, the free space arrangement is becoming more important as ad hoc sensor array signal processing using sensors mounted on terminals of a plurality of users, and is disclosed in detail in non-patent literature 5.

First Example Embodiment

Figure 1:
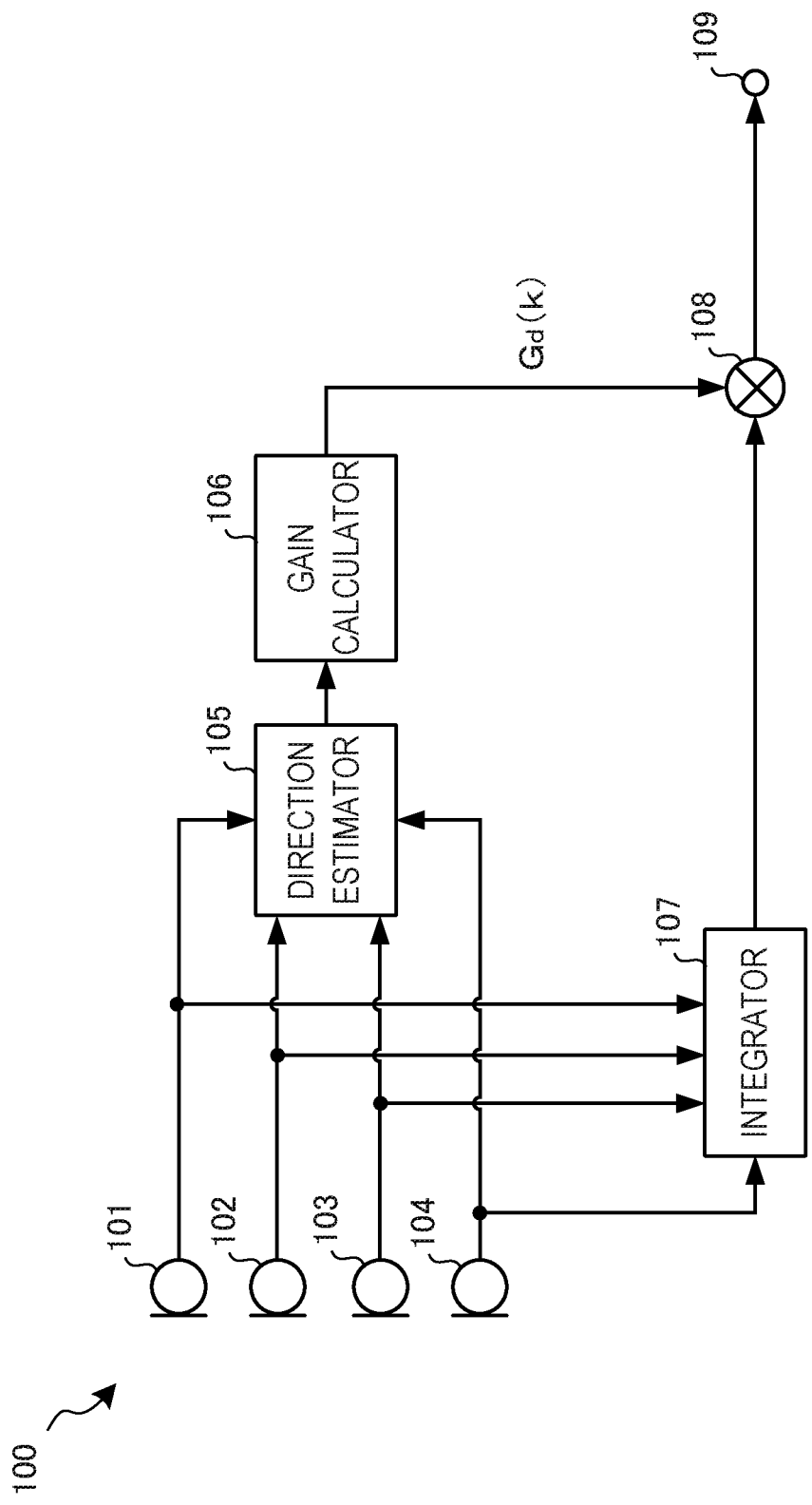
FIG. 1 is a block diagram showing the arrangement of a signal processing apparatus according to the first example embodiment of the present invention.

A signal processing apparatus 100 according to the first example embodiment of the present invention will be described with reference to FIG. 1. The signal processing apparatus 100 is an apparatus for enhancing or suppressing a wideband signal using signals from a plurality of sensors 101 to 104. As shown in FIG. 1, the signal processing apparatus 100 includes a direction estimator 105, a gain calculator 106, an integrator 107, and a multiplier 108. The direction estimator 105 obtains the DOA of a signal using the signals received from the plurality of sensors 101 to 104. The gain calculator 106 calculates the first gain using the DOA of the signal received from the direction estimator 105. The integrator 107 generates an integrated signal by integrating the signals received from the plurality of sensors 101 to 104. The multiplier 108 multiplies the first gain by the integrated signal, and sets the product as an enhanced signal in which a target signal is enhanced.

(Calculation of DOA of Signal)

There are known various methods of estimating the DOA of a signal. Non-patent literature 6 discloses a method (for example, a cross correlation method, a cross-spectral power analysis method, GCC-PHAT, or the like) using the phase difference between signals which arrive at a plurality of sensors, a subspace method represented by the MUSIC method, and the like.

To estimate the DOA of a signal, at least two sensors are necessary. Referring to FIG. 1, there are three pairs of two adjacent sensors, that is, a pair of the sensors 101 and 102, a pair of the sensors 102 and 103, and a pair of the sensors 103 and 104. The directions of arrival of signals at time k, which are obtained from the signals arriving at the sensors, are represented by $\phi 12(k)$, $\phi 23(k)$, and $\phi 34(k)$. Furthermore, there are two pairs of two sensors which are adjacent across one (every two or every other) sensor, that is, a pair of the sensors 101 and 103 and a pair of the sensors 102 and 104. There is also a pair of two sensors which are adjacent across two (every three) sensors, that is, a pair of the sensors 101 and 104. It is possible to estimate the DOA using such pairs. The DOA of signals at time k, which are obtained from the signals arriving at the sensors are represented by $\phi 13(k)$, $\phi 24(k)$, and $\phi 14(k)$. As described above, it is possible to select two of the plurality of sensors, and obtain the DOA of a signal in accordance with every different selection. In addition, it is possible to obtain the DOA of a signal using sensors whose number is represented by a natural number greater than 2.

One of the DOAs may be selected and used as a DOA $\phi(k)$ of a signal output from the direction estimator 105. Alternatively, the DOA $\phi(k)$ of the signal may be calculated using a plurality of estimated values of the DOA of the signals. For example, the median or average value of some or all of the estimated DOAs can be obtained, and set as the DOA $\phi(k)$ of the signal. The average value or median provides the more correct DOA $\phi(k)$ of the signal based on a plurality of measured DOAs.

Similarly, a statistical value associated with estimated DOAs about the plurality of DOA of the signals may be used. Examples of the statistical value are a maximum value and a minimum value in addition to the median and an average value.

The maximum value has the effect of extending the characteristics in which the phase difference is near zero to a region where the phase difference is larger. When enhancing a target signal, a signal passband spreads near zero, thereby making it possible to reduce the probability that a part of the target signal is erroneously suppressed due to a calculation error or the like. When suppressing the target signal, it is possible to reduce the probability that components other than the target signal are caused to erroneously remain due to a calculation error or the like.

The minimum value has the effect which is contrary to that of the maximum value. That is, the minimum value has the effect of extending the characteristics of a region where the phase difference is large to a region where the phase difference is small. When enhancing the target signal, the signal passband becomes narrow near zero, thereby making it possible to reduce the probability that components other than the target signal are caused to erroneously remain due to a calculation error or the like. When suppressing the target signal, it is possible to reduce the probability that a part of the target signal is erroneously suppressed due to a calculation error or the like.

(Calculation of Gain)

Figure 2:
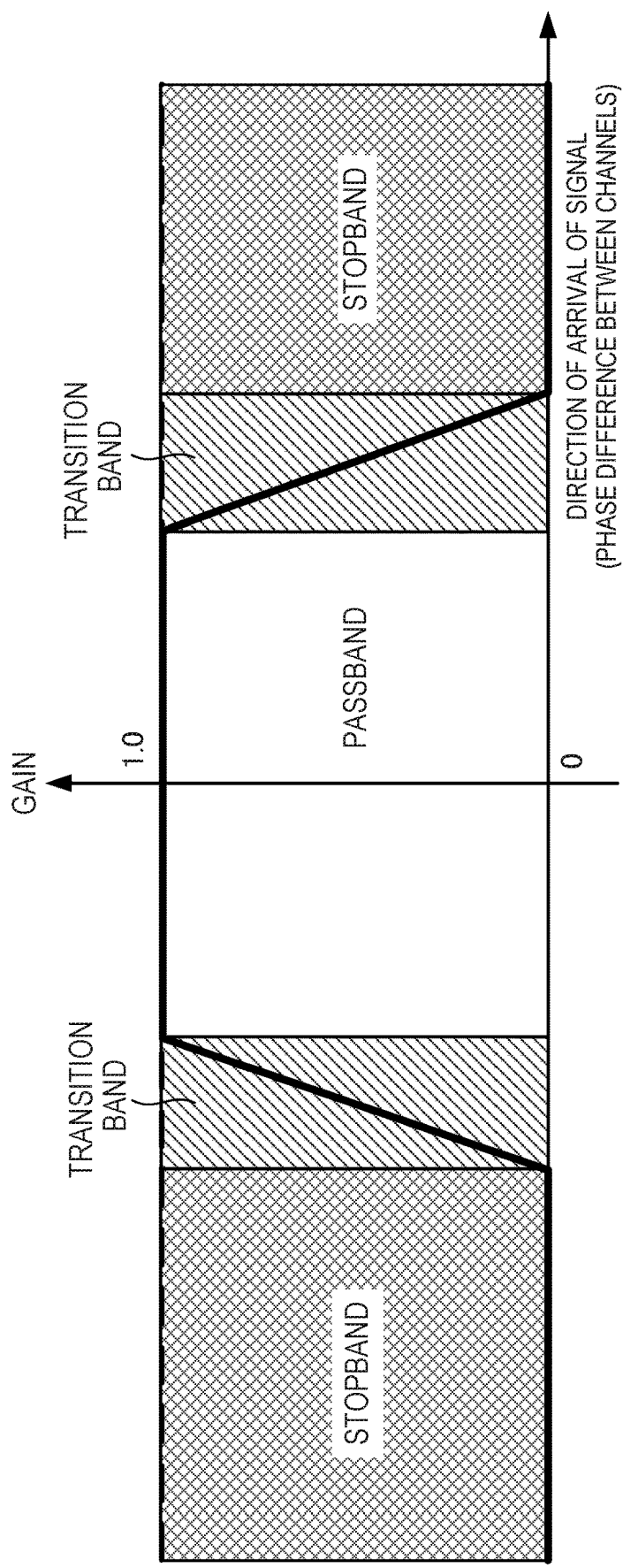
FIG. 2 is a graph showing the first example of the relationship between a gain and a phase difference used in a gain calculator according to the first example embodiment of the present invention.

The gain calculator 106 calculates a first gain Gd(k) using the DOA $\phi(k)$ of the signal received from the direction estimator 105, as follows. It is possible to calculate the first gain Gd(k) using the relationship between a gain and a predetermined DOA of a signal. FIG. 2 shows the first example of the relationship between the gain and the DOA $\phi(k)$ of the signal.

In FIG. 2, the abscissa represents the DOA $\phi(k)$ of the signal, and the ordinate represents the gain corresponding to the DOA $\phi(k)$ of the signal. In this example, the gain is set to fall within the range of 1 to 0. A gain of 1 indicates that an input is passed through without attenuation. A gain of 0 indicates that an input is completely blocked and nothing is passed through. The range of continuous phase differences having a gain of 1 is called a passband. The range of continuous phase differences having a gain of 0 is called a stopband. Between a passband and a stopband, there may be a transition band in which the gain slowly changes from 1 to 0 or 0 to 1.

In FIG. 2, the passband is colored in white, the transition band in light gray, and the stopband in dark gray for better readability. As is apparent from FIG. 2, in the first example, there are a passband near the DOA $\phi(k)=0$ of the signal, stopbands away from the DOA $\phi(k)=0$ of the signal, and the passband and a stopband are connected by a transition band. In this case, a signal with a DOA $\phi(k)$ close to 0 passes through without attenuation, and a signal with a DOA $\phi(k)$ away from 0 is completely blocked. Between those bands, there is a transition band of the DOA $\phi(k)$ of the signal in which the signal is partially attenuated. The passband and stopband may be directly continued without any transition band. The DOA $\phi(k)=0$ of the signal represents that the signal arrives from a direction perpendicular to a straight line connecting sensors used to obtain the DOA of the signal, that is, the signal is a front signal. Therefore, it is understood that the characteristics of the DOA $\phi(k)$ of the signal and the gain Gd(k) passes through a signal arriving from the front direction and blocks a signal arriving from another direction.

In FIG. 2, the passband and stopbands can be exchanged. In this case, the gain corresponding to the front direction is 0, and a signal arriving from a direction away from the front has a gain of 1. Therefore, it is understood that the characteristics of the DOA $\phi(k)$ of the signal and the gain Gd(k) blocks a signal arriving from the front direction and passes through a signal arriving from another direction. Furthermore, phase difference vs. gain characteristics may have a plurality of passbands and a plurality of stopbands.

Figure 3:
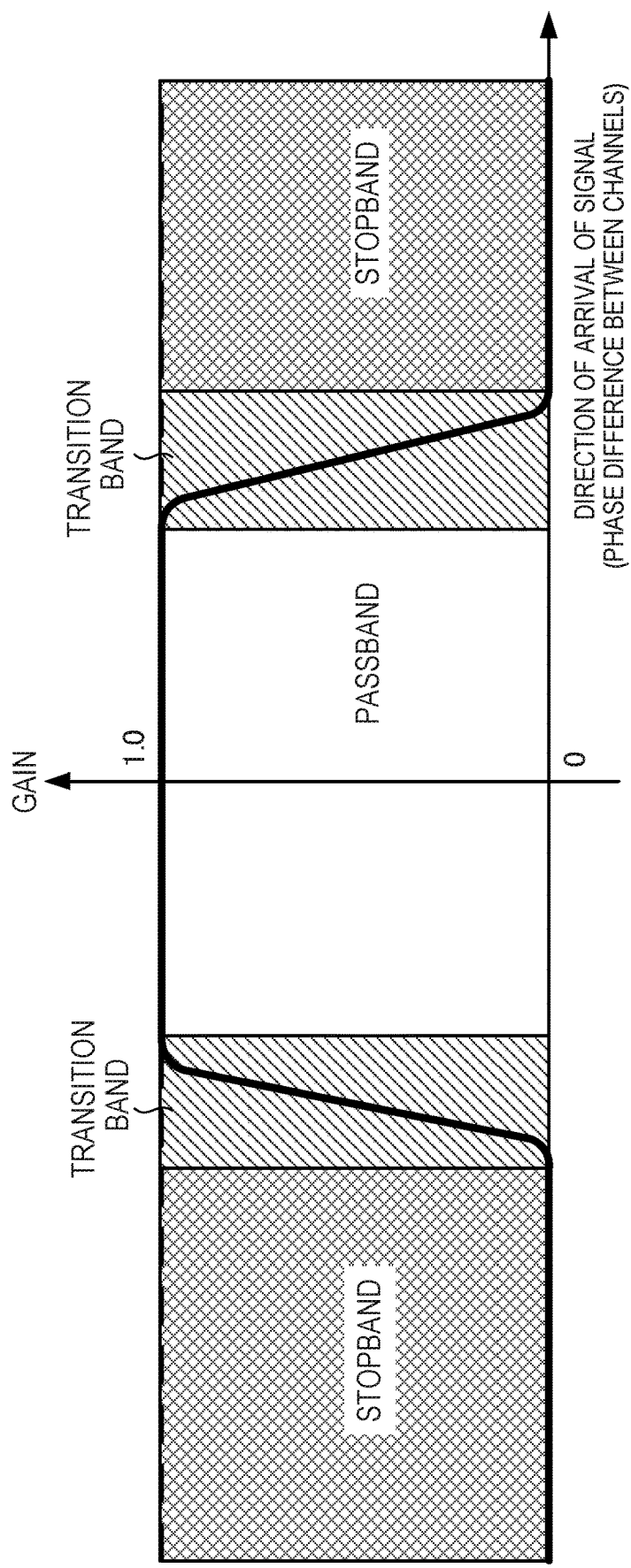
FIG. 3 is a graph showing the second example of the relationship between the gain and the phase difference used in the gain calculator according to the first example embodiment of the present invention.

FIG. 3 shows the second example of the relationship between the gain and the DOA φ(k) of the signal. FIG. 2 shows a locus indicating that clearly shows a change point from the passband to the transition band and a change point from the transition band to the stopband. In FIG. 3, a locus gradually and smoothly changes near the change points. Similarly to FIG. 2, the passbands and stopbands may be exchanged in the characteristics of FIG. 3.

Figure 4:
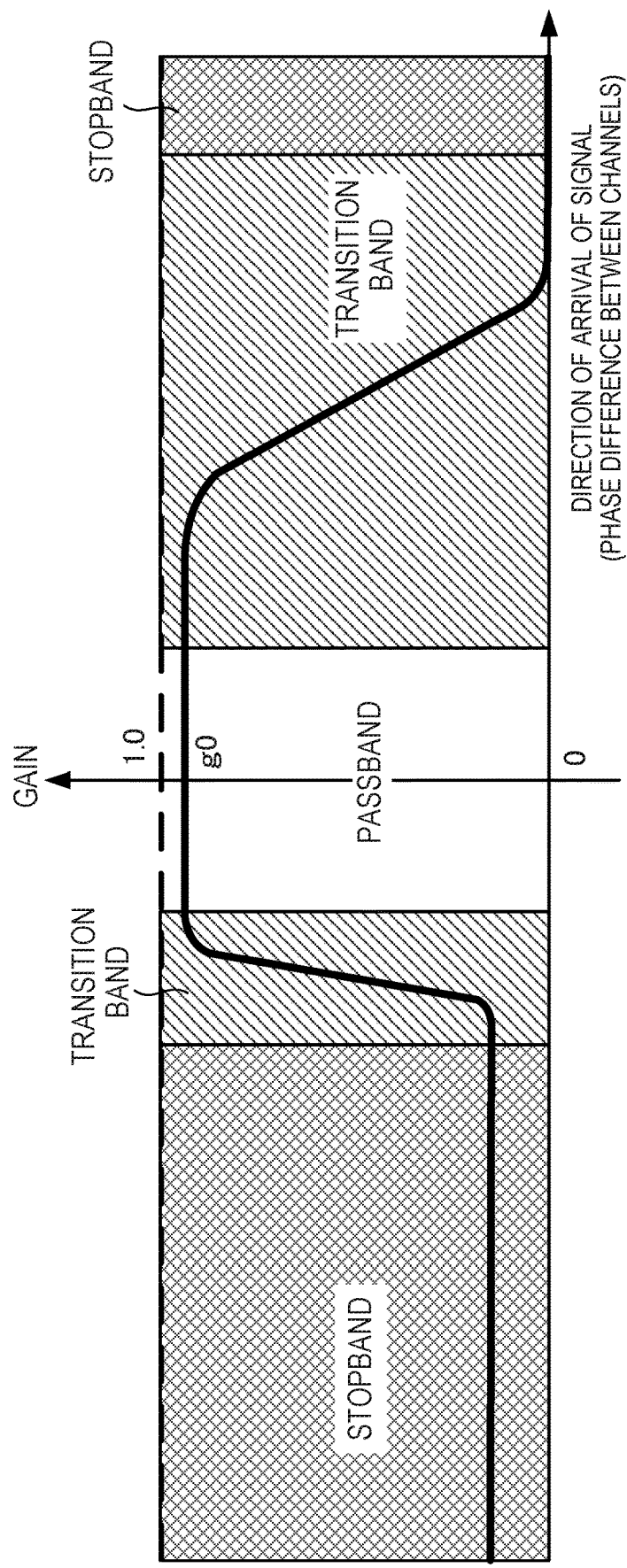
FIG. 4 is a graph showing the third example of the relationship between the gain and the phase difference used in the gain calculator according to the first example embodiment of the present invention.

FIG. 4 shows the third example of the relationship between the gain and the DOA φ(k) of the signal. In FIGS. 2 and 3, the same gain is assigned to the positive and the negative values of the DOA φ(k) of the signal as long as their absolute DOAs are equal to each other. That is, the phase difference vs. gain characteristics are symmetric about zero. FIG. 4 shows an example of an asymmetric characteristics of the DOA of the signal vs. the gain about zero. Especially, the transition bands are asymmetric about the DOA φ(k)=0 of the signal. In FIGS. 2 and 3, a maximum gain max{Gd (k)}=1 and a minimum gain min{Gd(k)}=0. To the contrary, in FIG. 4, the maximum gain max{Gd(k)}<1 and the minimum gain min{Gd(k)}>0. This represents that a signal having a DOA or phase difference corresponding to the passband is partially attenuated, and a signal having a DOA or phase difference corresponding to the stopband is not completely suppressed.

As will be apparent by multiplying all gains by a constant in the characteristics of FIGS. 2 to 4, one or both of the maximum gain and the minimum gain can take a value exceeding 1. This corresponds to amplification of the input signal.

As shown in FIGS. 2 and 3, if the relationship between the gain and the DOA φ(k) of the signal indicates symmetry about the DOA φ(k)=0 of the signal, the definitions of two sensors used to obtain the DOA of the signal may be exchanged; otherwise, the definitions cannot be exchanged. When the relationship indicates asymmetry, it is necessary to design characteristics representing the relationship between the gain and the DOA of the signal by considering, based on the physical sensor placement, which of the sensor signal is delayed from the other (sensor signal). When the relationship between the gain and the DOA φ(k) of the signal indicates symmetry, it is possible to obtain the DOA φ(k) of the signal, and then its absolute value |φ(k)|, thereby obtaining the first gain Gd(k) using the relationship between and the gain and the absolute value |φ(k)| of the DOA of the signal. When the relationship between the gain and the DOA of the signal indicates symmetry, it is possible to halve the memory capacity for storing the relationship between the gain Gd(k) and the DOA φ(k) of the signal.

[Generation of Integrated Signal]

The integrator 107 generates an integrated signal xs(k) by integrating signals x1(k), x2(k), x3(k), and x4(k) received from the plurality of sensors 101 to 104. As the integrated signal xs(k), an arbitrary one of x1(k), x2(k), x3(k), and x4(k) may be selected and used. Alternatively, a statistical value associated with these signals may be used. Examples of the statistical value are an average value, a maximum value, a minimum value, and a median. The average value or median provides a signal at a virtual sensor placed at the center of the sensors 101 to 104. The maximum value provides a signal at a sensor whose distance to the signal source is the shortest when the signal arrives from a direction other than the front. The minimum value provides a signal at a sensor whose distance to the signal source is the longest when the signal arrives from a direction other than the front. In addition, simple addition of these signals may be used. A value calculated in this way is used as an integrated signal.

With this arrangement, the signal processing apparatus 100 can realize, to a wideband signal, directivity (the gain based on the DOA of the signal) independent of the frequency. Therefore, it is possible to effectively enhance or suppress the wideband signal without increasing the size of the sensor array.

Note that the gain Gd(k) changes with time. That is, if the target signal is stronger than other components, the direction of the target signal is obtained as the DOA of the signal. Conversely, if the target signal is weaker than other components, the direction of the component other than the target signal is obtained as the DOA of the signal. Thus, a different gain is obtained depending on the composition of the input signal, and it is possible to obtain an output signal in which the difference between a signal to be enhanced and a signal to be suppressed is significant, as compared with the conventional array processing disclosed in non-patent literatures 1 to 4.

Second Example Embodiment

Figure 5:
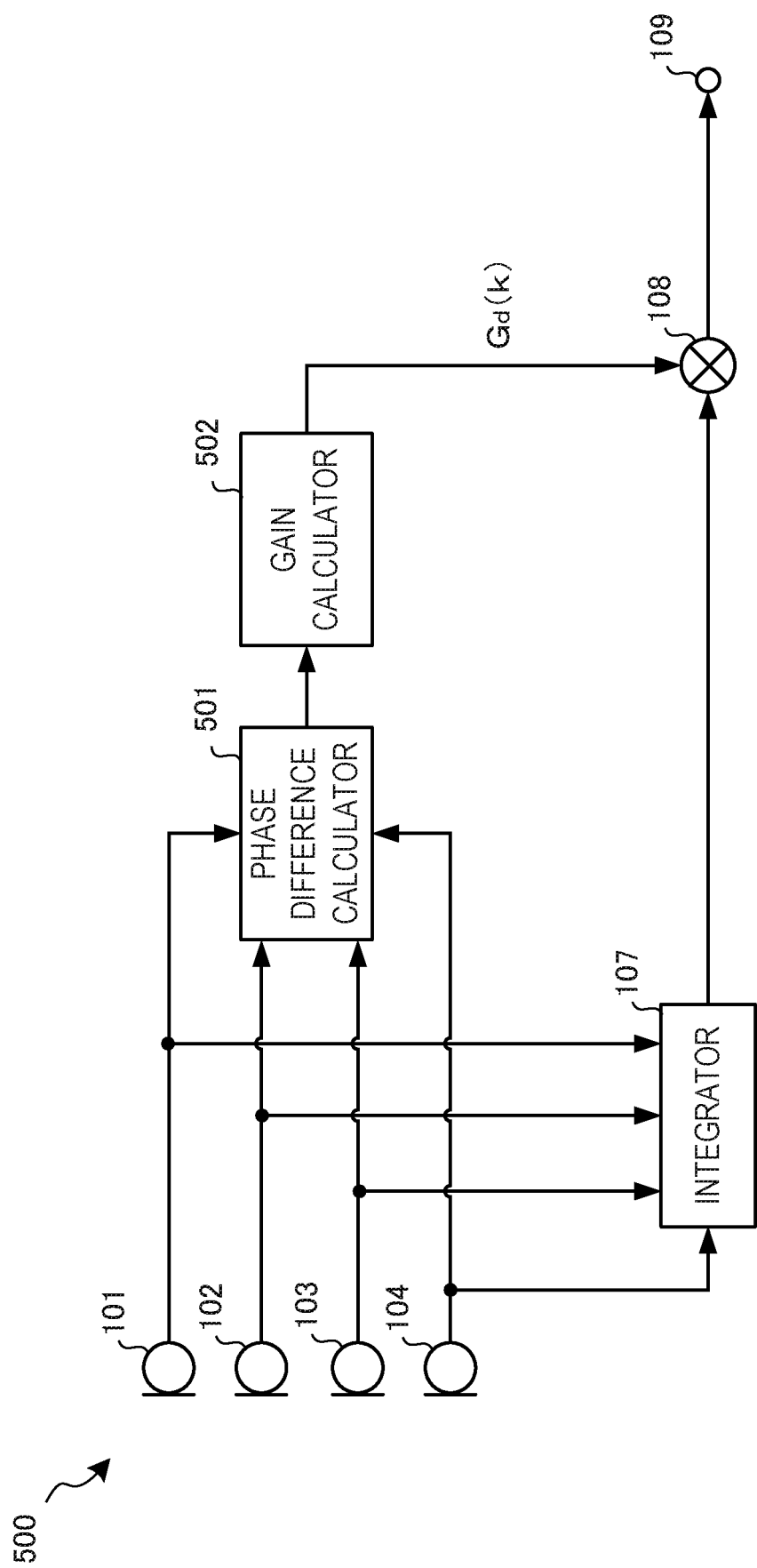
FIG. 5 is a block diagram showing the arrangement of a signal processing apparatus according to the second example embodiment of the present invention.

A signal processing apparatus 500 according to the second example embodiment of the present invention will be described with reference to FIG. 5. The signal processing apparatus 500 is an apparatus for enhancing or suppressing a wideband signal using signals from a plurality of sensors 101 to 104. As shown in FIG. 5, the signal processing apparatus 500 includes a phase difference calculator 501, a gain calculator 502, an integrator 107, and a multiplier 108. For the signals received from the plurality of sensors 101 to 104, the phase difference calculator 501 obtains the phase difference between signals in adjacent sensors, that is, adjacent channel signals. The gain calculator 502 calculates the second gain using the phase difference received from the phase difference calculator 501. The integrator 107 generates an integrated signal by integrating the signals received from the plurality of sensors 101 to 104. The multiplier 108 multiplies the second gain by the integrated signal, and sets the product as an enhanced signal in which a target signal is enhanced.

With this arrangement, the signal processing apparatus 500 can effectively enhance or suppress a wideband signal without increasing the size of a sensor array.

Compared to FIG. 1, the arrangement shown in FIG. 5 is same as that in FIG. 1 except that the direction estimator 105 and the gain calculator 106 are replaced by the phase difference calculator 501 and the gain calculator 502. Only the operations of the phase difference calculator 501 and gain calculator 502 as different components will be described and a description of the remaining components will be omitted.

(Calculation of Phase Difference)

The phase difference calculator 501 obtains a phase difference Δθ(k) between adjacent channel signals from the signals received from the plurality of sensors 101 to 104, as follows.

The phase difference between the adjacent channel signals is calculated by selecting arbitrary two adjacent sensors from the plurality of sensors, and using the signals from the selected sensors. Assume that the selected sensors are the sensors 101 and 102. When the values, at time k, of the signals received from the sensors 101 to 104 are represented by x1(k), x2(k), x3(k), and x4(k), a phase difference Δθ12(k)

between x1($k$) and x2($k$) is obtained by equation (1), and used as the phase difference between the adjacent channel signals.

$$\Delta\theta(k)=\Delta\theta12(k)=2\pi f\cdot\tau12(k) \quad (1)$$

where $\tau12(k)$ represents a relative delay between x1($k$) and x2($k$), and is $\tau i$ corresponding to a maximum correlation Cor12($k$) between x1($k-\tau i$) and x2($k$). Cor12($k$) can be obtained by:

$$Cor12(k) = \max\left\{\sum_{i=-k\,max}^{k\,max} x1(k-i)\cdot x2(k)\right\} \quad (2)$$

where k max represents a maximum number of samples which is determined by a sampling frequency and the interval between the sensors 101 and 102. It is equal to the ratio between the sampling frequency and a relative delay of a signal arriving from the side of the array. That is, $$k\,max = d\cdot\sin(\pi/2)/c\cdot fs = d/c\cdot fs \quad (3)$$

where d represents the sensor interval, c represents the sound velocity, and fs represents the sampling frequency. By using equation (1), it is possible to obtain the phase difference $\Delta\theta(k)$ between the adjacent channel signals at an arbitrary frequency f. Similarly, $\Delta\theta23(k)$ or $\Delta\theta31(k)$ may be used instead of $\Delta\theta12(k)$. The second gain proportional to the frequency may be calculated from an offset-removed phase difference obtained by removing the offset in the frequency direction from the phase difference.

As the phase difference between the adjacent channel signals, a statistical value of the above three values, that is, $\Delta\theta12(k)$, $\Delta\theta23(k)$, and $\Delta\theta31(k)$ may be used. Examples of the statistic value may be an average value, a maximum value, a minimum value, and a median. The average value or median provides a more correct phase difference between the adjacent channel signals based on a plurality of measured phase differences.

The maximum value has the effect of extending the characteristics in which the phase difference is near zero to a region where the phase difference is larger, as will be described later. When enhancing a target signal, a signal passband spreads near zero, thereby making it possible to reduce the probability that a part of the target signal is erroneously suppressed due to a calculation error or the like. When suppressing the target signal, it is possible to reduce the probability that components other than the target signal are caused to erroneously remain due to a calculation error or the like.

The minimum value has the effect which is contrary to that of the maximum value. That is, the minimum value has the effect of extending the characteristics of a region where the phase difference is large to a region where the phase difference is small. When enhancing the target signal, the signal passband becomes narrow near zero, thereby making it possible to reduce the probability that components other than the target signal are caused to erroneously remain due to a calculation error or the like. When suppressing the target signal, it is possible to reduce the probability that a part of the target signal is erroneously suppressed due to a calculation error or the like.

The phase difference between the adjacent channel signals is calculated by selecting, from the plurality of sensors, arbitrary two sensors which are adjacent across one (every two or every other) sensor, and using the signals of the selected sensors. Examples of such a pair are a pair of the sensors 101 and 103 and a pair of the sensors 102 and 104 in the example of the four sensors shown in FIG. 5. Considering the sensors 101 and 103, the phase difference $\Delta\theta13$ between x1($k$) and x3($k$) is obtained, and is multiplied by ½, and the thus obtained value is set as the phase difference between the adjacent channel signals. This is because the phase difference is proportional to the sensor interval.

$$\Delta\theta(k) = \Delta\theta13(k)/2 = \pi f\cdot\tau13(k) \quad (4)$$

$$Cor13(k) = \max\left\{\sum_{i=-k\,max}^{k\,max} x1(k-i)\cdot x3(k)\right\} \quad (5)$$

where k max represents a maximum number of samples which is determined by a sampling frequency and the interval between the sensors 101 and 103. By using equation (4), it is possible to obtain the phase difference $\Delta\theta(k)$ between the adjacent channel signals at the arbitrary frequency f. Similarly, $\Delta\theta24(k)$ may be used instead of $\Delta\theta13(k)$. It is also apparent that a statistical value of these phase differences may be used.

The phase difference between the adjacent channel signals can also be calculated by selecting, from the plurality of sensors, arbitrary two sensors which are adjacent across (M−1) (every M−1) sensors, and using the signals of the selected sensors. An example of such a pair is a pair of the sensors 101 and 104 in the example of the four sensors shown in FIG. 5 when M=3. A phase difference $\Delta\theta14$ between x1($k$) and x4($k$) is obtained, and is multiplied by ⅓, and the thus obtained value is set as the phase difference between the adjacent channel signals. That is, the obtained phase difference is divided by a number obtained by adding one to the number of sensors sandwiched between the selected sensors, and the quotient is used.

$$\Delta\theta(k) = \Delta\theta14(k)/3 = \pi f\cdot\tau14(k) \quad (6)$$

$$Cor14(k) = \max\left\{\sum_{i=k\,max}^{k\,max} x1(k-i)\cdot x4(k)\right\} \quad (7)$$

where k max represents a maximum number of samples which is determined by a sampling frequency and the interval between the sensors 101 and 104.

By using equation (6), it is possible to obtain the phase difference $\Delta\theta(k)$ between the adjacent channel signals at the arbitrary frequency f. Although an example of M=3 has been exemplified, it also applies to an arbitrary natural number of M≥1. If M≥4, there are a plurality of pairs satisfying this condition, and any one of the pairs may be used to obtain the phase difference $\Delta\theta(k)$. It is also apparent that a statistical value of these phase differences can be used.

(Calculation of Gain)

As is well known and understood from equation (3), the relative delay $\tau12(k)$ has a relationship given by equation (8) below depending on the DOA $\phi(k)$ of the signal. Therefore, equation (1) can also be represented by equation (9).

$$\tau12(k)=d\cdot\sin\phi(k)/c \quad (8)$$

$$\Delta\theta(k)=\Delta\theta12(k)=2\pi f d\cdot\sin\phi(k)/c \quad (9)$$

Similarly, it is understood that equation (4) or (6) can be represented by equation (9) by considering that d in equation (8) is replaced by 2d or 3d. Equation (9) indicates that the phase difference $\Delta\theta(k)$ is proportional to the frequency f with respect to the signals arriving from the same direction $\phi(k)$. That is, the relative delay $\tau(k)$ between the signals of two sensors with respect to the signals arriving from the same direction $\phi(k)$ is constant regardless of the frequency, and the phase difference $\Delta\theta(k)$ between the signals of the two sensors is proportional to the frequency. Therefore, in the relationship between the phase difference $\Delta\theta(k)$ and the gain, the phase difference $\Delta\theta(k)$ needs to be proportional to the frequency.

The phase difference vs. gain characteristics at a specific frequency can be determined similarly to a DOA of signal vs. gain. For example, in FIGS. 2 to 4, if the DOA of the signal of the abscissa is replaced by the corresponding phase difference, the DOA of signal vs. gain characteristics can be used intact as the phase difference vs. gain characteristics.

Figure 6:
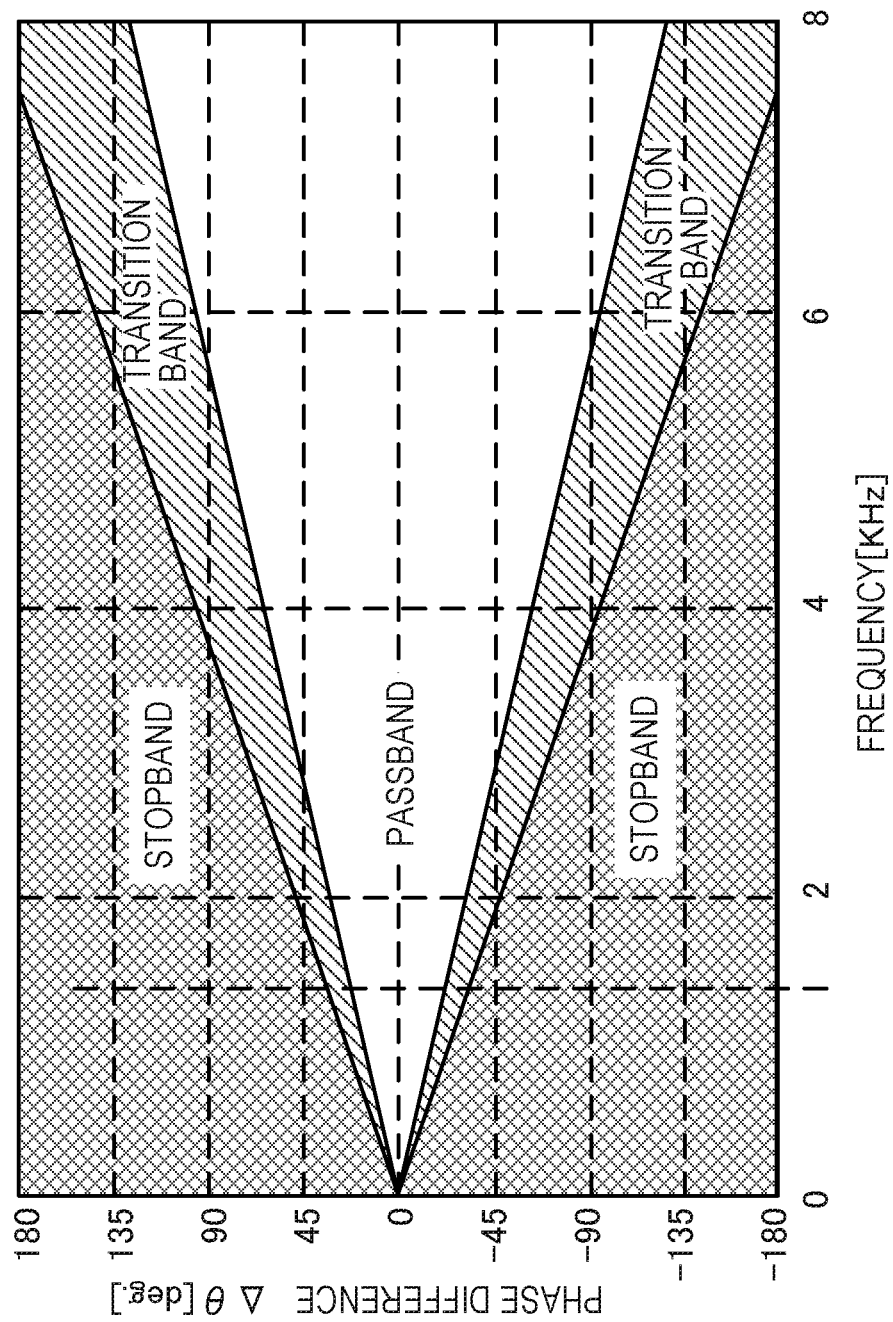
FIG. 6 is a graph showing the first example of the relationship between a gain, a frequency, and a phase difference used in a gain calculator according to the second example embodiment of the present invention.

Since the phase difference $\Delta\theta(k)$ needs to be proportional to the frequency, the phase difference vs. gain characteristics at a frequency (the second frequency) different from a specific frequency (set as the first frequency) are obtained by horizontally expanding the abscissa in FIGS. 2 to 4 by the ratio between the first and the second frequencies. That is, in FIGS. 2 to 4, a frequency axis on which the frequency increases in the depth direction is determined, thereby obtaining characteristics in which the passbands, transition bands, and stopbands become wider from the near side to the far side. FIG. 6 shows an example of the top view of the three-dimensional characteristics associated with the phase difference, the frequency, and the gain.

FIG. 6 shows an example in which the abscissa represents the frequency, the ordinate represents the phase difference $\Delta\theta(k)$, and the direction perpendicular to the paper surface represents the gain, and corresponds to FIG. 2. The passbands, transition bands, and stopbands are colored in white, light gray, and dark gray, respectively. In the rightward direction of the frequency axis, that is, as the frequency increases, the passbands, transition bands, and stopbands become wider. Note that if the best performance is not desired, the phase difference and the frequency need not always be proportional. By simply setting the phase difference corresponding to the same gain to become large as the frequency increases, directivity (the gain based on the DOA of the signal) which does not largely depend on the frequency may be assigned to the wideband signal.

With this arrangement, the signal processing apparatus 500 can assign, to a wideband signal, directivity (the gain based on the DOA of the signal) independent of the frequency. Therefore, it is possible to effectively enhance or suppress the wideband signal without increasing the size of the sensor array.

Third Example Embodiment

Figure 7:
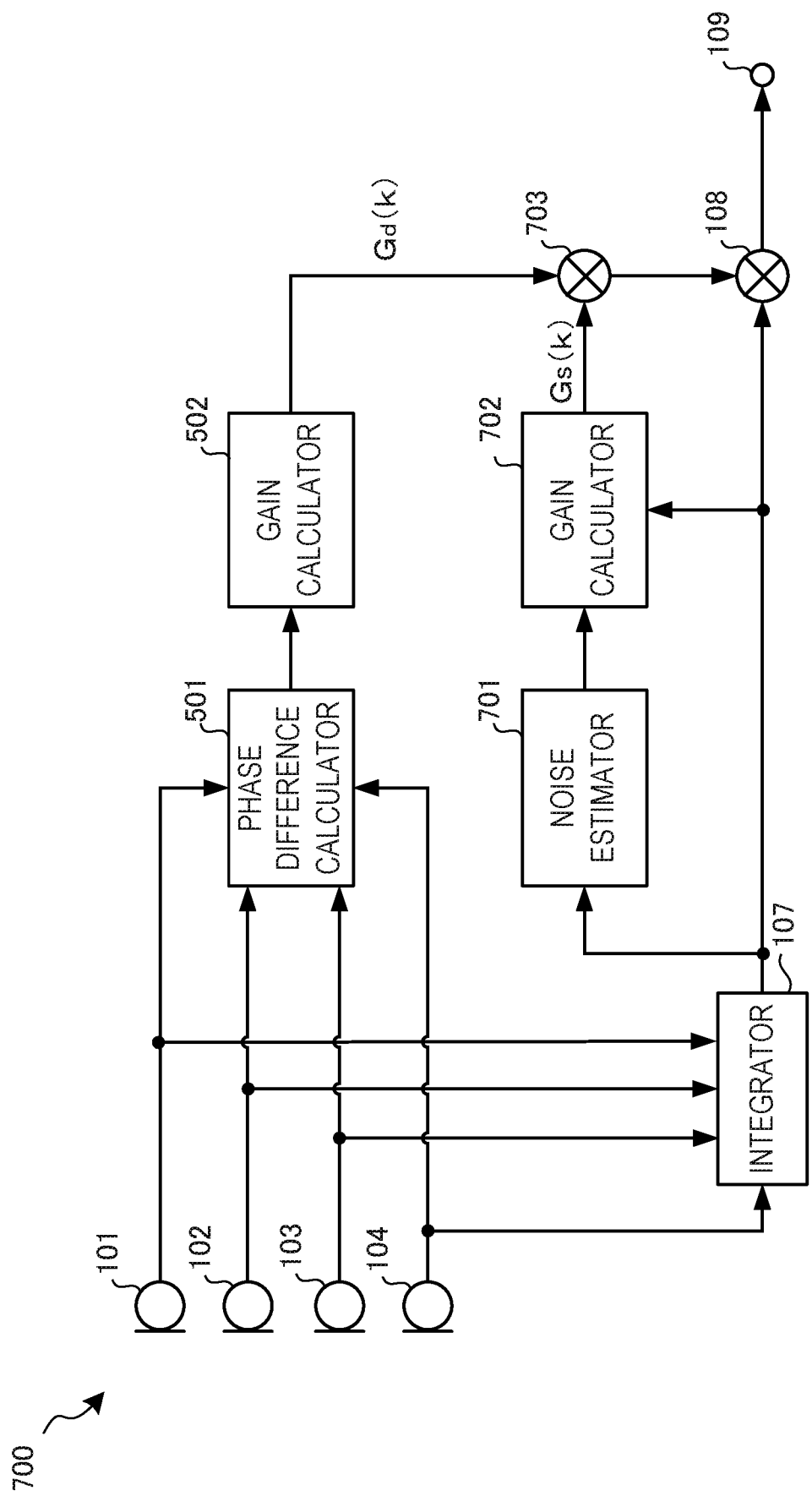
FIG. 7 is a block diagram showing the arrangement of a signal processing apparatus according to the third example embodiment of the present invention.

A signal processing apparatus 700 according to the third example embodiment of the present invention will be described with reference to FIG. 7. The signal processing apparatus 700 is an apparatus for enhancing or suppressing a wideband signal using signals from a plurality of sensors 101 to 104. As shown in FIG. 7, the signal processing apparatus 700 includes a phase difference calculator 501, a gain calculator 502, an integrator 107, a multiplier 108, a noise estimator 701, a gain calculator 702, and a multiplier 703.

Compared to FIG. 5, the arrangement shown in FIG. 7 is same as that in FIG. 5 except that the noise estimator 701, the gain calculator 702, and the multiplier 703 are added. Only the operations of the noise estimator 701, gain calculator 702, and multiplier 703 as different components will be described and a description of the remaining components will be omitted.

The noise estimator 701 receives an integrated signal, and estimates the power or absolute amplitude of a noise component contained in the integrated signal. Various noise estimation methods are disclosed in non-patent literature 7, and a description thereof will be omitted.

The gain calculator 702 receives a noise estimated value and the integrated signal, and calculates a gain Gs(k) for suppressing noise contained in the integrated signal. Examples of the gain calculation method are a minimum mean squared error (MMSE) method and a maximum a posteriori (MAP) method. They are disclosed in detail in non-patent literature 6, and a description thereof will be omitted.

The multiplier 703 multiplies the gain Gs(k) by a gain Gd(k), thereby obtaining a product Gs(k)·Gd(k). The multiplier 108 multiplies the integrated signal by the product Gs(k)·Gd(k), thereby setting the multiplication result as an enhanced signal.

With this arrangement, the signal processing apparatus 700 can assign, to a wideband signal, directivity (the gain based on the DOA of the signal) independent of the frequency. Therefore, it is possible to effectively enhance or suppress the wideband signal without increasing the size of a sensor array. In addition, the integrated signal is also multiplied by the gain Gs(k) for suppressing background noise, and thus an output in which a target signal is enhanced more is obtained.

Fourth Example Embodiment

Figure 8:
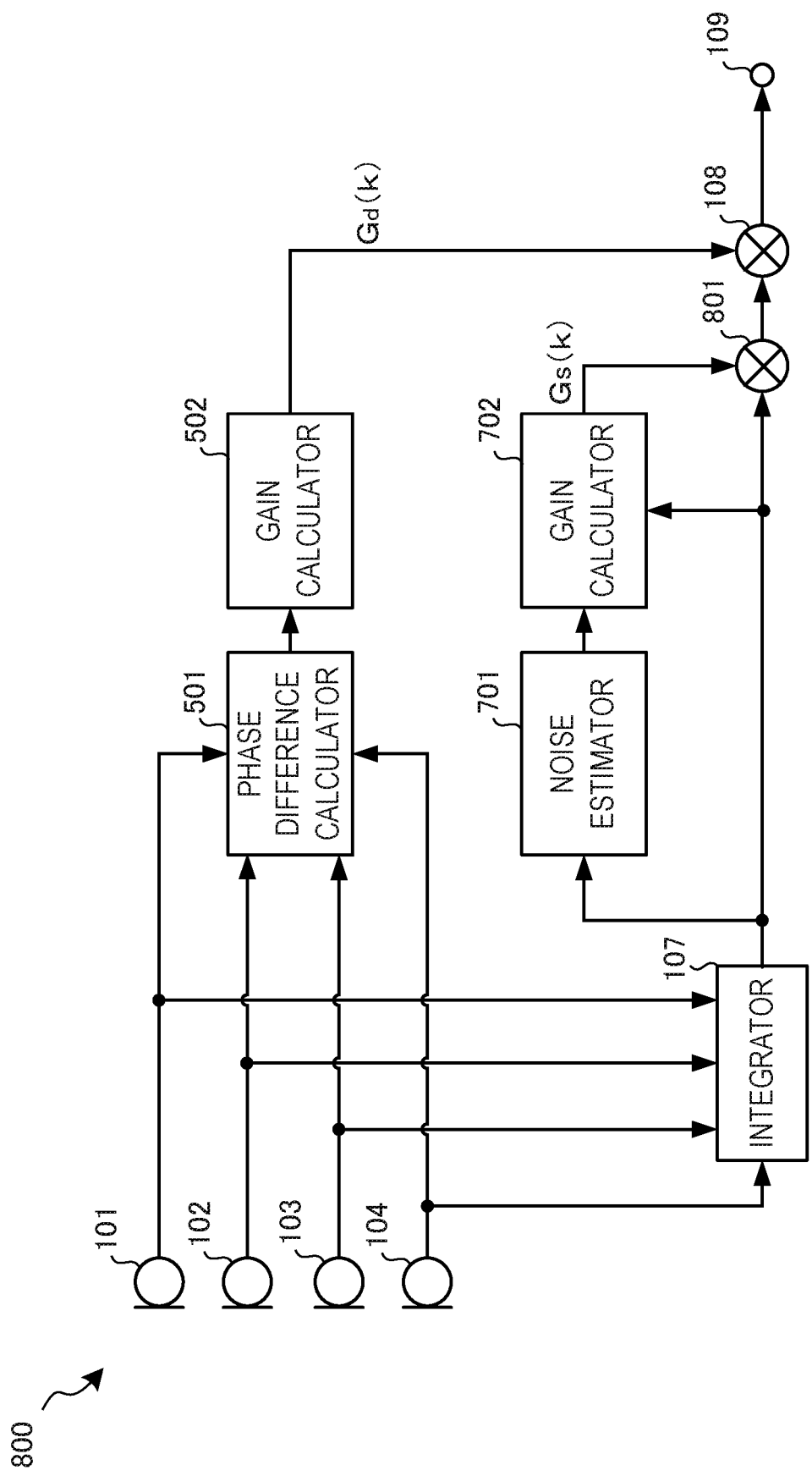
FIG. 8 is a block diagram showing the arrangement of a signal processing apparatus according to the fourth example embodiment of the present invention.

A signal processing apparatus 800 according to the fourth example embodiment of the present invention will be described with reference to FIG. 8. The signal processing apparatus 800 is an apparatus for enhancing or suppressing a wideband signal using signals from a plurality of sensors 101 to 104. As shown in FIG. 8, the signal processing apparatus 800 includes a phase difference calculator 501, a gain calculator 502, an integrator 107, a multiplier 108, a noise estimator 701, a gain calculator 702, and a multiplier 801.

Compared to FIG. 7, the arrangement shown in FIG. 8 is same as that in FIG. 7 except that the multiplier 801 is used instead of the multiplier 703. Only the operation of the multiplier 801 as a different component will be described and a description of the remaining components will be omitted.

The multiplier 801 multiplies a gain Gs(k) by an integrated signal, thereby obtaining the integrated signal in which background noise is suppressed. The multiplier 108 multiplies, by a gain Gd(k), the integrated signal in which background noise is suppressed, thereby setting the multiplication result as an enhanced signal. That is, the enhanced signals according to this example embodiment and the third example embodiment are equal to each other.

With this arrangement, the signal processing apparatus 800 can assign, to a wideband signal, directivity (the gain based on the DOA of the signal) independent of the frequency. Therefore, it is possible to effectively enhance or suppress the wideband signal without increasing the size of a sensor array. In addition, the integrated signal is also multiplied by the gain Gs(k) for suppressing background noise, and thus an output in which a target signal is enhanced more is obtained.

Fifth Example Embodiment

Figure 9:
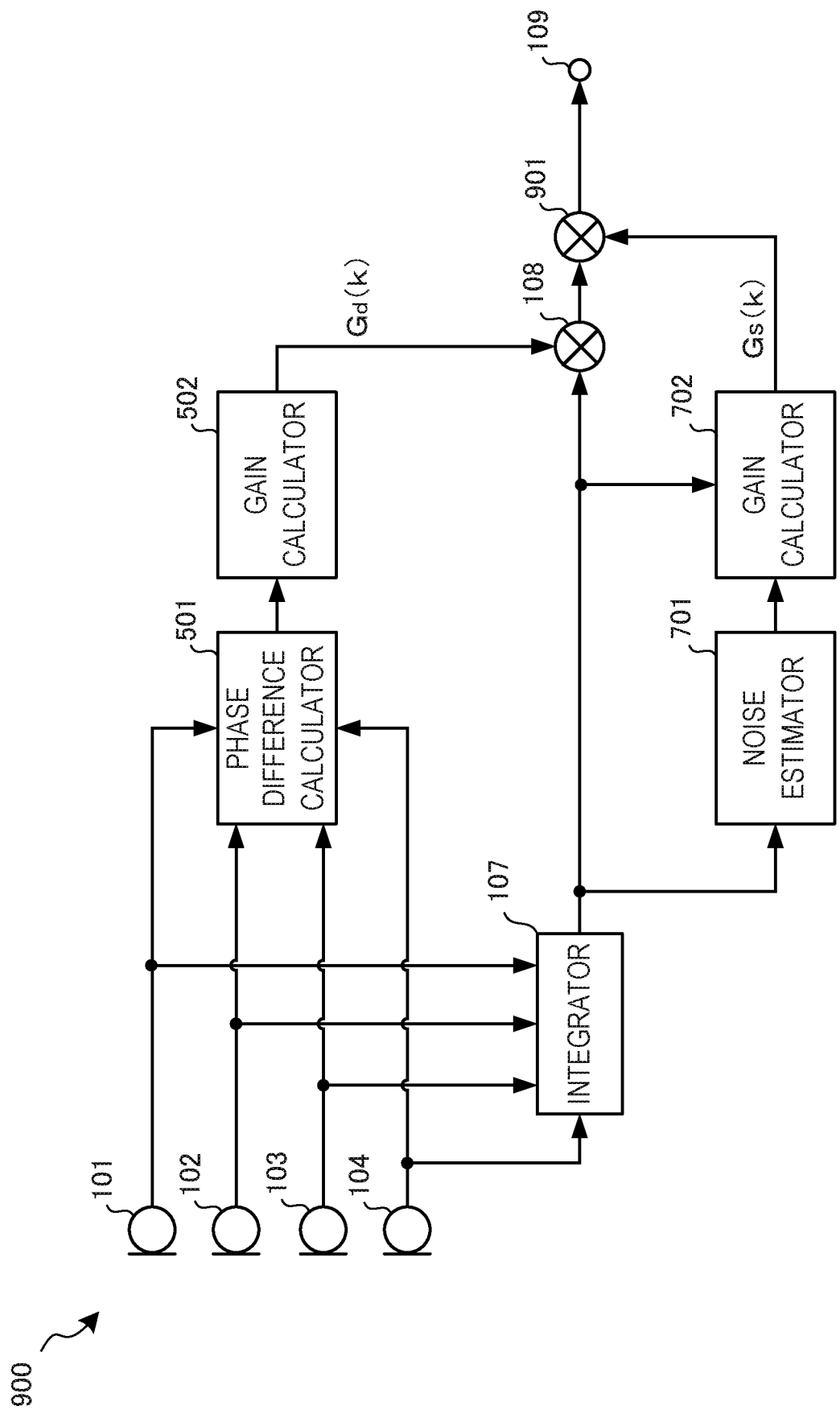
FIG. 9 is a block diagram showing the arrangement of a signal processing apparatus according to the fifth example embodiment of the present invention.

A signal processing apparatus 900 according to the fifth example embodiment of the present invention will be described with reference to FIG. 9. The signal processing apparatus 900 is an apparatus for enhancing or suppressing a wideband signal using signals from a plurality of sensors 101 to 104. As shown in FIG. 9, the signal processing apparatus 900 includes a phase difference calculator 501, a gain calculator 502, an integrator 107, a multiplier 108, a noise estimator 701, a gain calculator 702, and a multiplier 901.

Compared to FIG. 8, the arrangement shown in FIG. 9 is same as that in FIG. 8 except that the multiplier 901 is used instead of the multiplier 801. Only the operation of the multiplier 901 as a different component will be described and a description of the remaining components will be omitted.

The multiplier 901 multiplies a gain Gs(k) by the output of the multiplier 108, thereby setting the multiplication result as an enhanced signal. That is, the enhanced signals according to the fifth example embodiment and third and fourth example embodiments are equal to each other.

With this arrangement, the signal processing apparatus 900 can assign, to a wideband signal, directivity (the gain based on the DOA of the signal) independent of the frequency. Therefore, it is possible to effectively enhance or suppress the wideband signal without increasing the size of a sensor array. In addition, an integrated signal is also multiplied by the gain Gs(k) for suppressing background noise, and thus an output in which a target signal is enhanced more is obtained.

Sixth Example Embodiment

Figure 10:
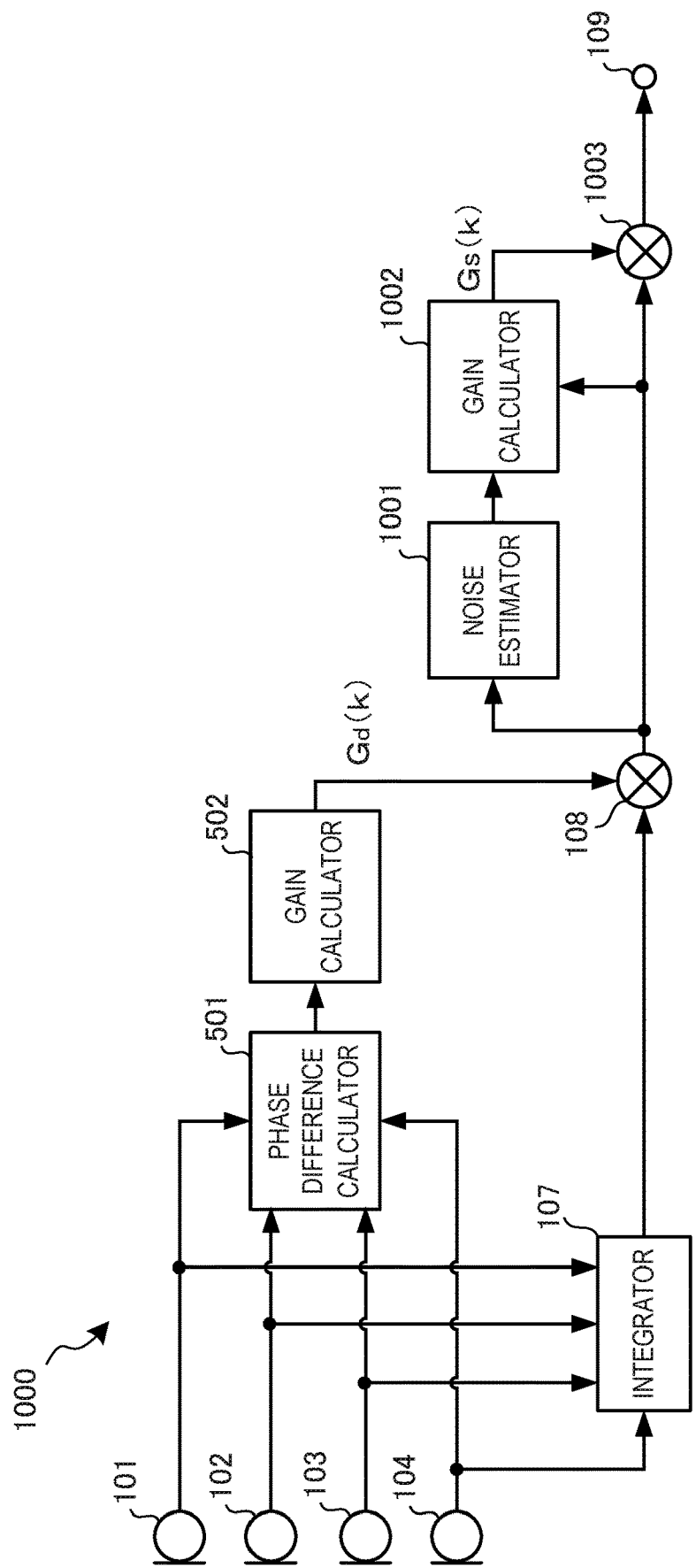
FIG. 10 is a block diagram showing the arrangement of a signal processing apparatus according to the sixth example embodiment of the present invention.

A signal processing apparatus 1000 according to the sixth example embodiment of the present invention will be described with reference to FIG. 10. The signal processing apparatus 1000 is an apparatus for enhancing or suppressing a wideband signal using signals from a plurality of sensors 101 to 104. As shown in FIG. 10, the signal processing apparatus 1000 includes a phase difference calculator 501, a gain calculator 502, an integrator 107, a multiplier 108, a noise estimator 1001, a gain calculator 1002, and a multiplier 1003.

Compared to FIG. 5, the arrangement shown in FIG. 10 is same as that in FIG. 5 except that the noise estimator 1001, the gain calculator 1002, and the multiplier 1003 are added. Only the operations of the noise estimator 1001, gain calculator 1002, and multiplier 1003 as different components will be described and a description of the remaining components will be omitted.

The noise estimator 1001 performs completely the same operation as that of the noise estimator 701 to receive the output of the multiplier 108 and estimate the power or absolute amplitude of a noise component contained in the output. The gain calculator 1002 performs completely the same operation as that of the gain calculator 702 to receive a noise estimated value and the output of the multiplier 108 and calculate a gain Gs(k) for suppressing noise contained in the output of the multiplier 108. The multiplier 1003 multiplies the output of the multiplier 108 by the gain Gs(k), thereby setting the multiplication result as an enhanced signal.

With this arrangement, the signal processing apparatus 1000 can assign, to a wideband signal, directivity (the gain based on the DOA of the signal) independent of the frequency. Therefore, it is possible to effectively enhance or suppress the wideband signal without increasing the size of a sensor array. In addition, an integrated signal is also multiplied by the gain Gs(k) for suppressing background noise, and thus an output in which a target signal is enhanced more is obtained.

Seventh Example Embodiment

Figure 11:
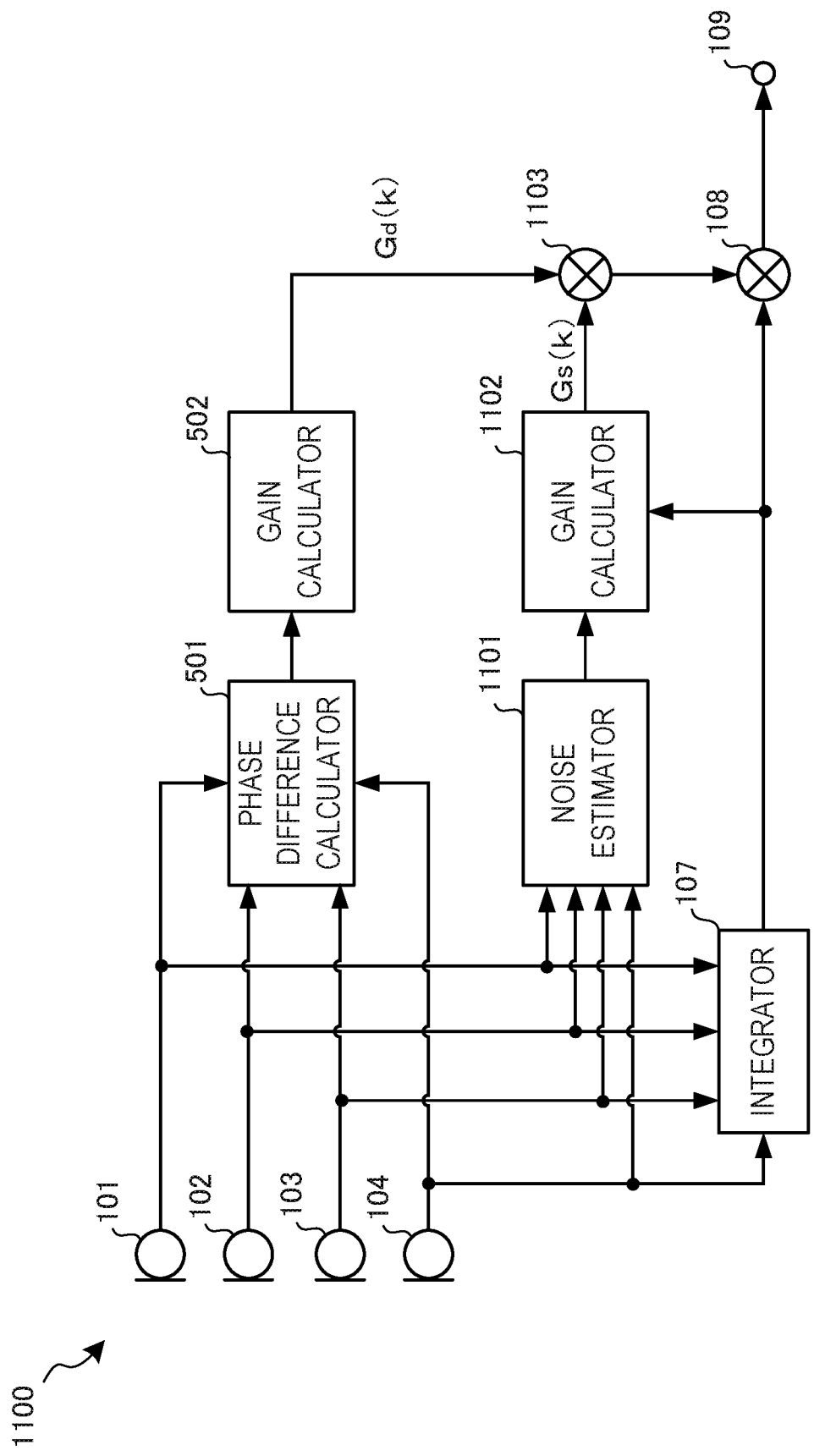
FIG. 11 is a block diagram showing the arrangement of a signal processing apparatus according to the seventh example embodiment of the present invention.

A signal processing apparatus 1100 according to the seventh example embodiment of the present invention will be described with reference to FIG. 11. The signal processing apparatus 1100 is an apparatus for enhancing or suppressing a wideband signal using signals from a plurality of sensors 101 to 104. As shown in FIG. 11, the signal processing apparatus 1100 includes a phase difference calculator 501, a gain calculator 502, an integrator 107, a multiplier 108, a noise estimator 1101, a gain calculator 1102, and a multiplier 1103.

Compared to FIG. 7, the arrangement shown in FIG. 11 is same as that in FIG. 7 except that the noise estimator 701, the gain calculator 702, and the multiplier 703 are replaced by the noise estimator 1101, the gain calculator 1102, and the multiplier 1103. Only the operations of the noise estimator 1101, gain calculator 1102, and multiplier 1103 as different components will be described and a description of the remaining components will be omitted.

The noise estimator 1101 receives the signals from the plurality of sensors 101 to 104, and estimates the powers or absolute amplitudes of components other than target signals contained in the signals. More specifically, the noise estimator 1101 estimates the powers or absolute amplitudes of components other than the target signals by operating as a null beamformer which receives the signals from the plurality of sensors 101 to 104. The null beamformer is disclosed in detail in non-patent literatures 2 and 6 and a description thereof will be omitted.

With this arrangement, the signal processing apparatus 1100 can assign, to a wideband signal, directivity (the gain based on the DOA of the signal) independent of the frequency. Therefore, it is possible to effectively enhance or suppress the wideband signal without increasing the size of a sensor array. Since the null beamformer is used to estimate background noise, it is possible to reduce the influence of a directional signal other than background noise, and obtain, as an output, enhanced speech of high quality via correct background noise estimation.

Eighth Example Embodiment

Figure 12:
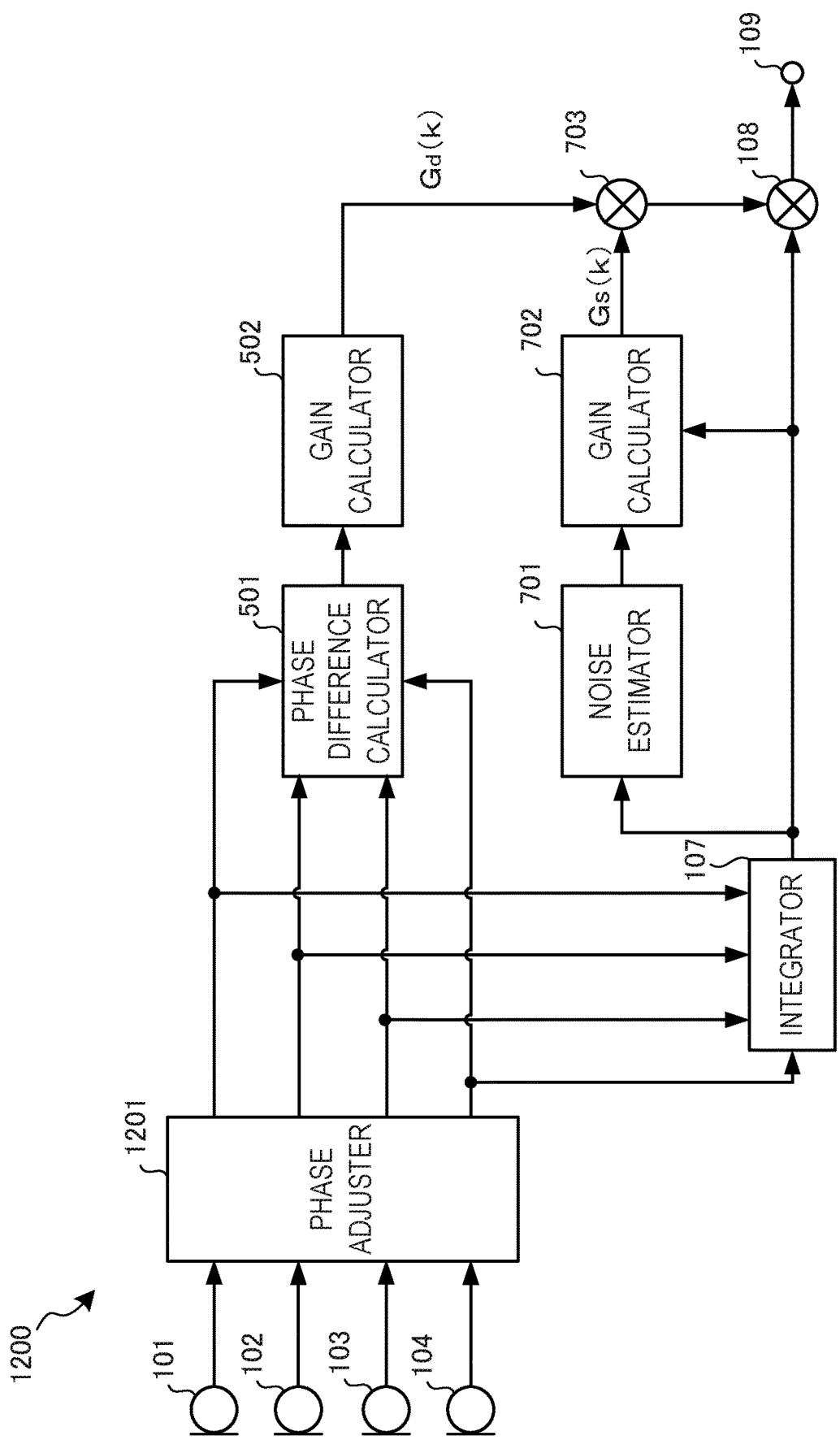
FIG. 12 is a block diagram showing the arrangement of a signal processing apparatus according to the eighth example embodiment of the present invention.

A signal processing apparatus 1200 according to the eighth example embodiment of the present invention will be described with reference to FIG. 12. The signal processing apparatus 1200 is an apparatus for enhancing or suppressing a wideband signal using signals from a plurality of sensors 101 to 104. As shown in FIG. 12, the signal processing apparatus 1200 includes a phase difference calculator 501, a gain calculator 502, an integrator 107, a multiplier 108, a noise estimator 701, a gain calculator 702, a multiplier 703, and a phase adjuster 1201.

Compared to FIG. 7, the arrangement shown in FIG. 12 is same as that in FIG. 7 except that the phase adjuster 1201 is added. Only the operation of the phase adjuster 1201 as a different component will be described and a description of the remaining components will be omitted.

The phase adjuster 1201 receives the signals from the plurality of sensors 101 to 104, adjusts the phases of the signals from the respective sensors so that the target signal looks as if it equivalently arrived from the front, and outputs phase-adjusted signals. This is processing called beam steering, and is disclosed in detail in non-patent literatures 2 and 6, and a description thereof will be omitted.

With this arrangement, the signal processing apparatus 1200 can assign, to a wideband signal, directivity (the gain based on the DOA of the signal) independent of the frequency. Therefore, it is possible to effectively enhance or suppress the wideband signal without increasing the size of a sensor array. In addition, since the apparatus has a beam steering function, it is possible to obtain, for a target signal arriving from a direction other than the front, the same effect as that for a target signal arriving from the front.

Ninth Example Embodiment

Figure 13:
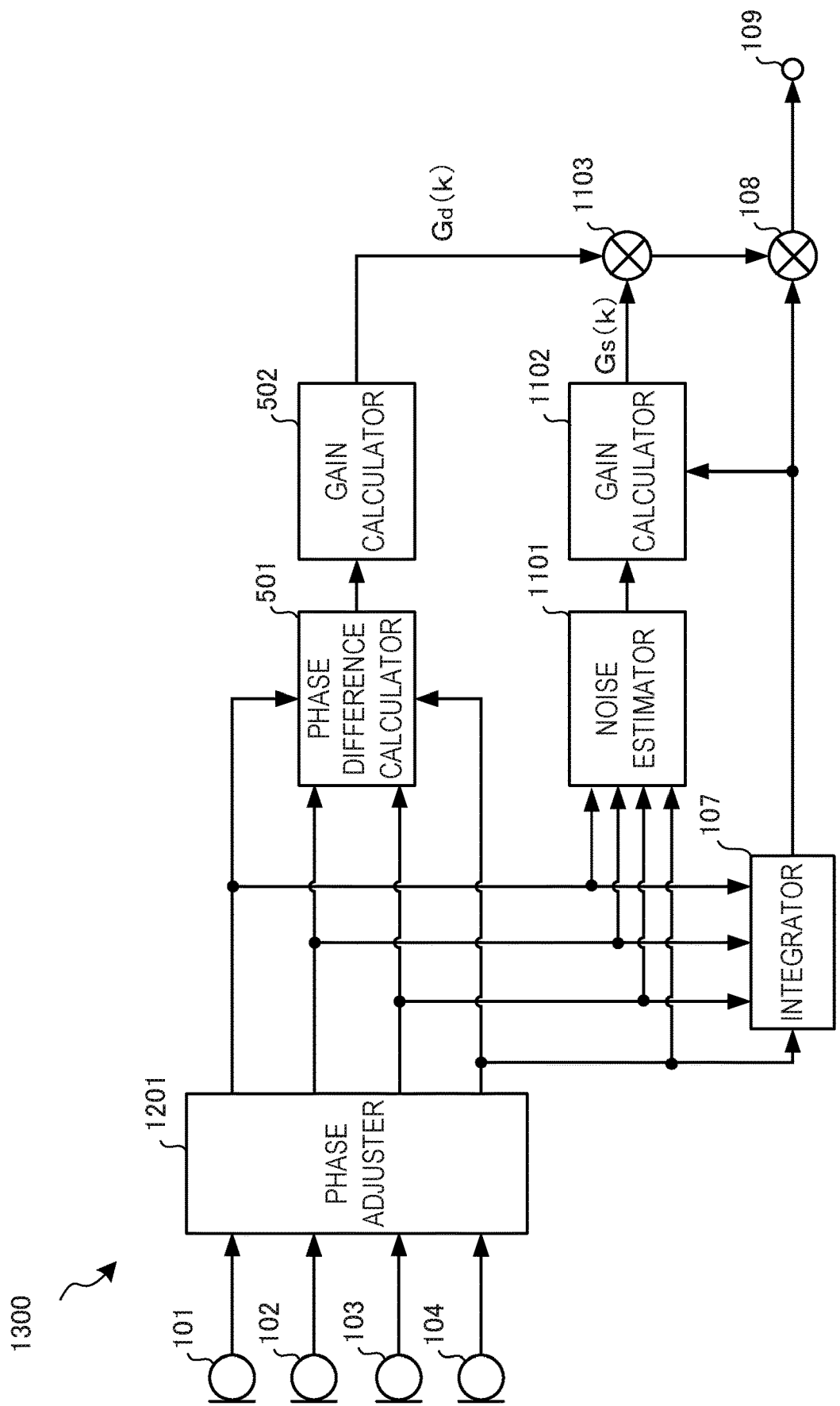
FIG. 13 is a block diagram showing the arrangement of a signal processing apparatus according to the ninth example embodiment of the present invention.

A signal processing apparatus 1300 according to the ninth example embodiment of the present invention will be described with reference to FIG. 13. The signal processing apparatus 1300 is an apparatus for enhancing or suppressing a wideband signal using signals from a plurality of sensors 101 to 104. As shown in FIG. 13, the signal processing apparatus 1300 includes a phase difference calculator 501, a gain calculator 502, an integrator 107, a multiplier 108, a noise estimator 1101, a gain calculator 1102, a multiplier 1103, and a phase adjuster 1201.

Compared to FIG. 12, the arrangement shown in FIG. 13 is same as that in FIG. 12 except that the noise estimator 701, the gain calculator 702, and the multiplier 703 are replaced by the noise estimator 1101, the gain calculator 1102, and the multiplier 1103. This is equivalent to the relationship between FIGS. 11 and 7, and has already been explained, and a description thereof will be omitted.

With this arrangement, the signal processing apparatus 1300 can assign, to a wideband signal, directivity (the gain based on the DOA of the signal) independent of the frequency. Therefore, it is possible to effectively enhance or suppress the wideband signal without increasing the size of a sensor array. Since a null beamformer is used to estimate background noise, it is possible to reduce the influence of a directional signal other than background noise, and obtain, as an output, enhanced speech of high quality via correct background noise estimation. In addition, since the apparatus has a beam steering function, it is possible to obtain, for a target signal arriving from a direction other than the front, the same effect as that for a target signal arriving from the front.

10th Example Embodiment

Figure 14:
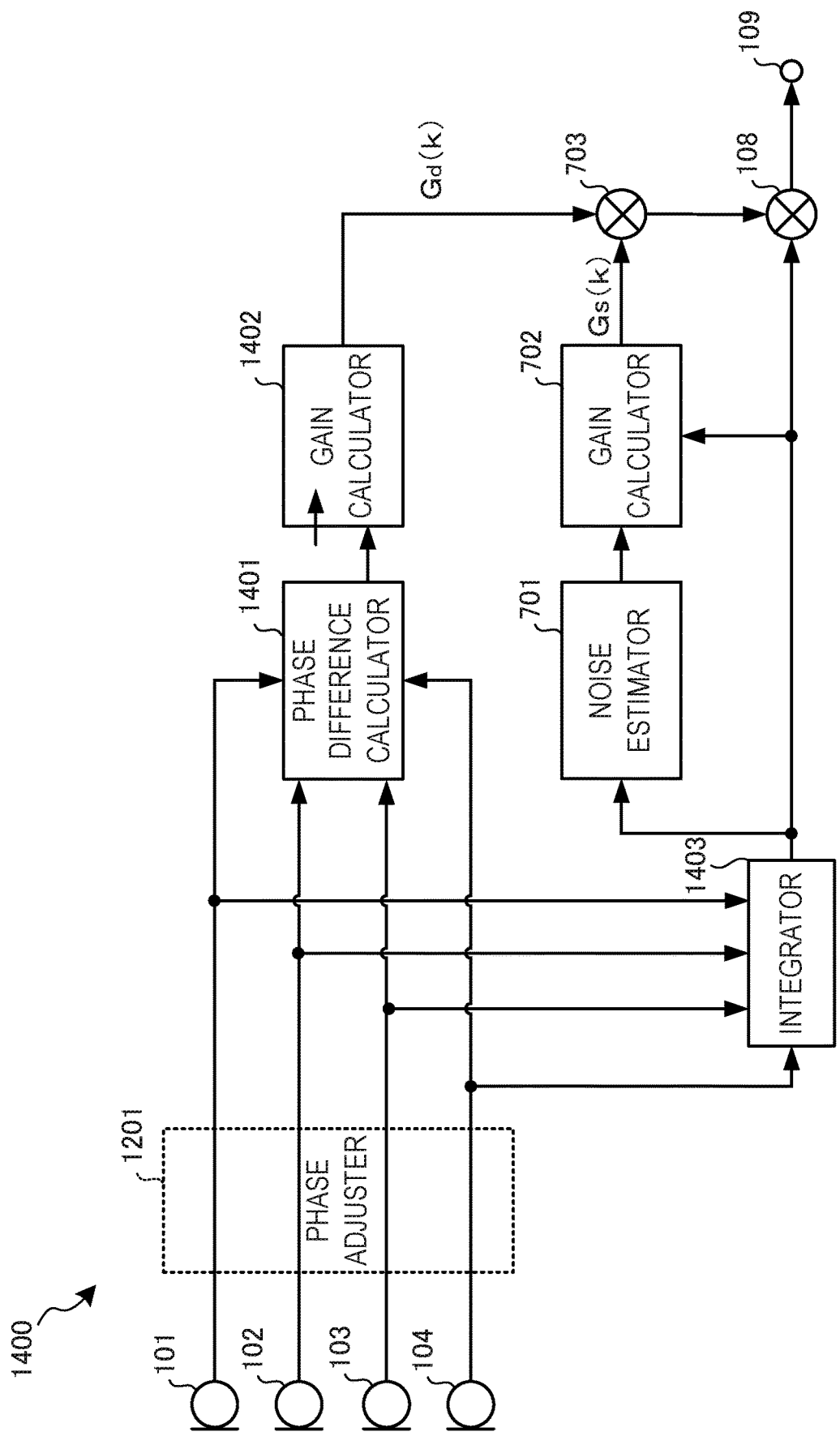
FIG. 14 is a block diagram showing the arrangement of a signal processing apparatus according to the 10th example embodiment of the present invention.

A signal processing apparatus 1400 according to the 10th example embodiment of the present invention will be described with reference to FIG. 14. The signal processing apparatus 1400 is an apparatus for enhancing or suppressing a wideband signal using signals from a plurality of sensors 101 to 104. As shown in FIG. 14, the signal processing apparatus 1400 includes a phase difference calculator 1401, a gain calculator 1402, an integrator 1403, a multiplier 108, a noise estimator 701, a gain calculator 702, and a multiplier 703.

Compared to FIG. 12, the arrangement shown in FIG. 14 is same as that in FIG. 12 except that the phase adjuster 1201 is deleted, and the phase difference calculator 501, the gain calculator 502, and the integrator 107 are replaced by the phase difference calculator 1401, the gain calculator 1402, and the integrator 1403. Only the operations of the phase difference calculator 1401, gain calculator 1402, and integrator 1403 as different components will be described and a description of the remaining components will be omitted.

In addition to the function of the phase difference calculator 501, the phase difference calculator 1401 has a function of receiving the signals from the plurality of sensors 101 to 104 and obtaining a phase adjustment amount δ of the signal from each sensor so that a target signal looks as if it equivalently arrived from the front. The obtained phase adjustment amount δ is supplied to the gain calculator 1402 together with a phase difference Δθ(k).

Figure 15:
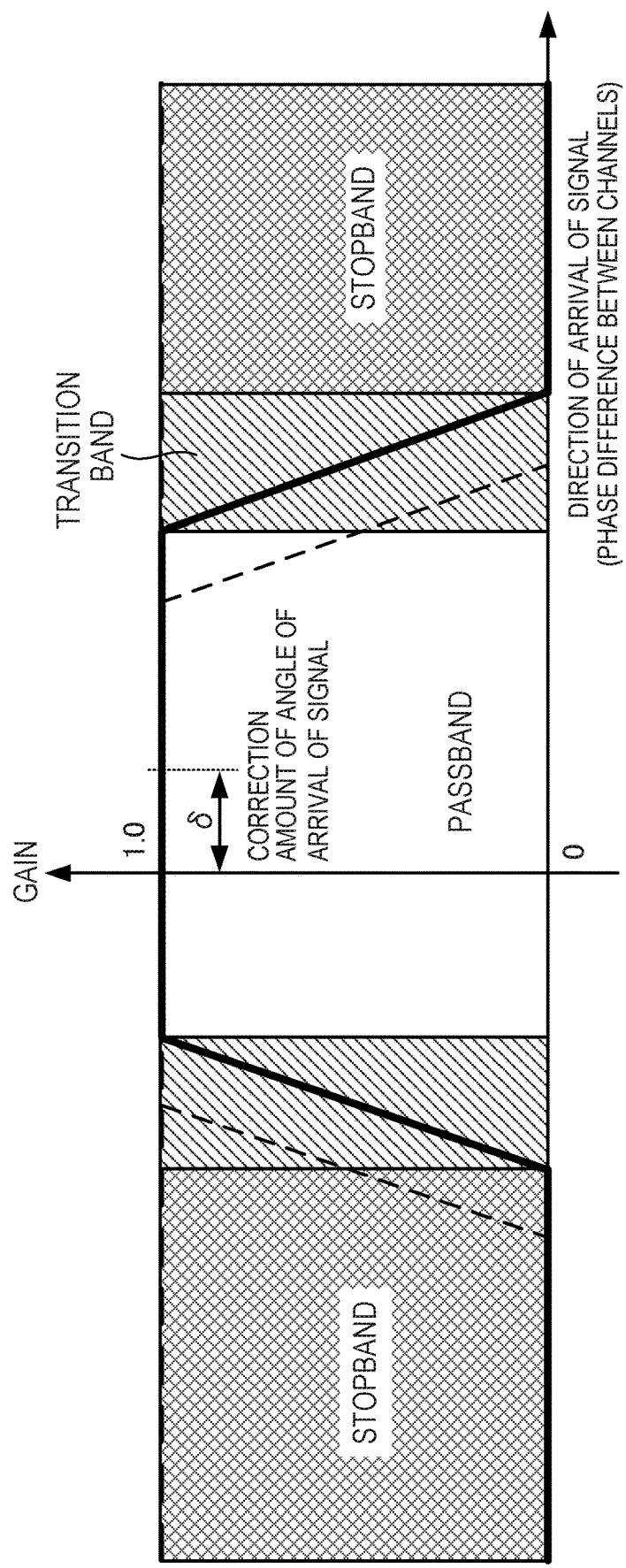
FIG. 15 is a graph showing an example of the relationship between a gain and a phase difference used in a gain calculator according to the 10th example embodiment of the present invention.

The gain calculator 1402 horizontally shifts phase difference vs. gain characteristics by δ, as shown in FIG. 15. The horizontal shift δ equivalently shifts the front by δ, thereby functioning as beam steering. Accordingly, beam steering is necessary in the integrator 1403. Thus, the integrator 1403 has the function of the phase adjuster 1201 and the function of the integrator 107. The integrator 1403 estimates the DOA of the target signal, and performs beam steering so that the DOA is newly set to the front. For the signal having undergone beam steering, the same processing as that of the integrator 107 is performed to generate an integrated signal (phase-adjusted integrated signal).

With this arrangement, the signal processing apparatus 1400 can assign, to a wideband signal, directivity (the gain based on the DOA of the signal) independent of the frequency. Therefore, it is possible to effectively enhance or suppress the wideband signal without increasing the size of a sensor array. In addition, since the apparatus has a beam steering function, it is possible to obtain, for a target signal arriving from a direction other than the front, the same effect as that for a target signal arriving from the front.

11th Example Embodiment

Figure 16:
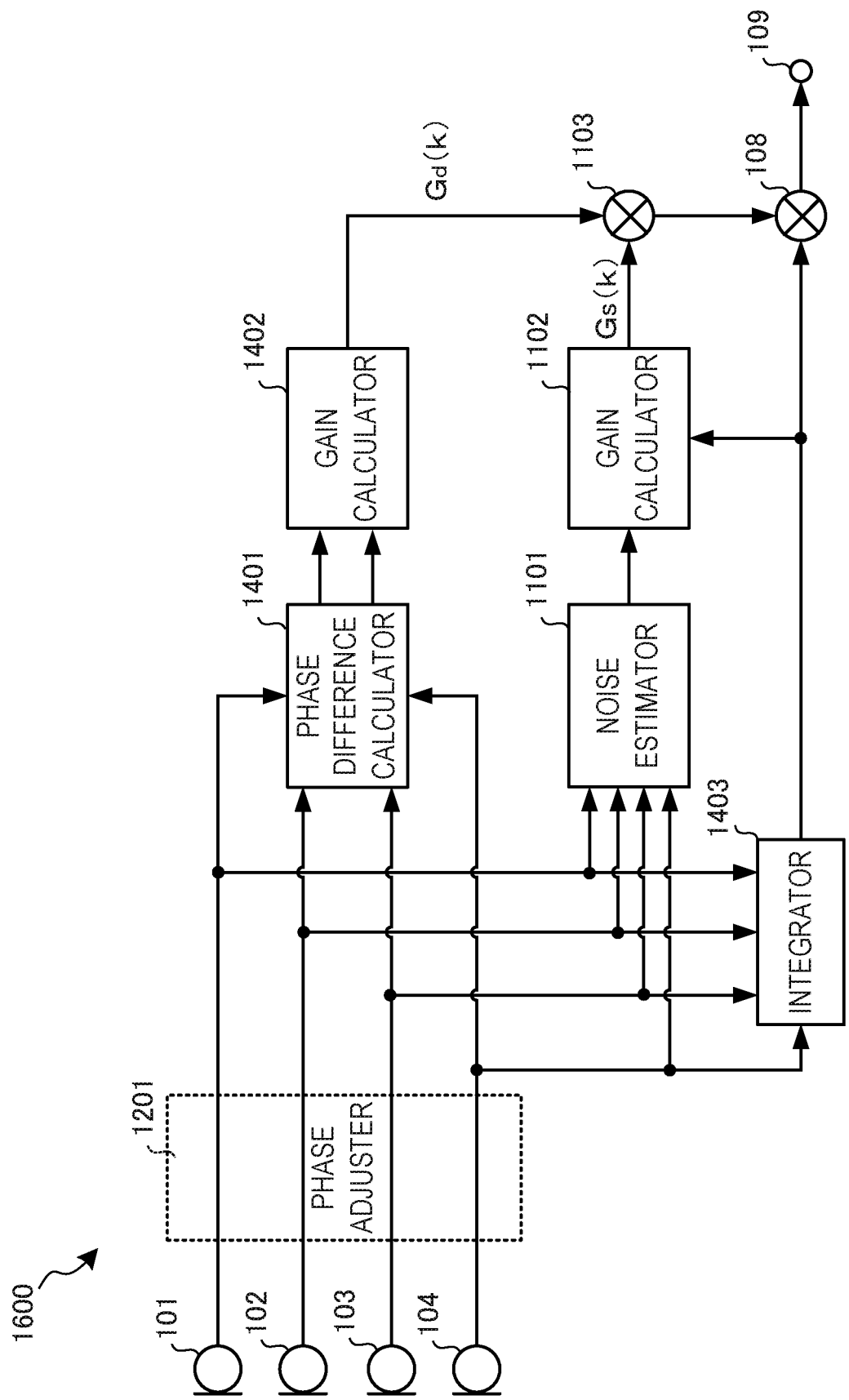
FIG. 16 is a block diagram showing the arrangement of a signal processing apparatus according to the 11th example embodiment of the present invention.

A signal processing apparatus 1600 according to the 11th example embodiment of the present invention will be described with reference to FIG. 16. The signal processing apparatus 1600 is an apparatus for enhancing or suppressing a wideband signal using signals from a plurality of sensors 101 to 104. As shown in FIG. 16, the signal processing apparatus 1600 includes a phase difference calculator 1401, a gain calculator 1402, an integrator 1403, a multiplier 108, a noise estimator 1101, a gain calculator 1102, and a multiplier 1103.

Compared to FIG. 13, the arrangement shown in FIG. 16 is same as that in FIG. 13 except that the phase adjuster 1201 is deleted, and the phase difference calculator 501, the gain calculator 502, and the integrator 107 are replaced by the phase difference calculator 1401, the gain calculator 1402, and the integrator 1403. This is equivalent to the relationship between FIGS. 14 and 12, and has already been explained, and a description thereof will be omitted.

With this arrangement, the signal processing apparatus 1600 can assign, to a wideband signal, directivity (the gain based on the DOA of the signal) independent of the frequency. Therefore, it is possible to effectively enhance or suppress the wideband signal without increasing the size of a sensor array. Since the null beamformer is used to estimate background noise, it is possible to reduce the influence of a directional signal other than background noise, and obtain, as an output, enhanced speech of high quality via correct background noise estimation. In addition, since the apparatus has a beam steering function, it is possible to obtain, for a target signal arriving from a direction other than the front, the same effect as that for a target signal arriving from the front.

12th Example Embodiment

Figure 17:
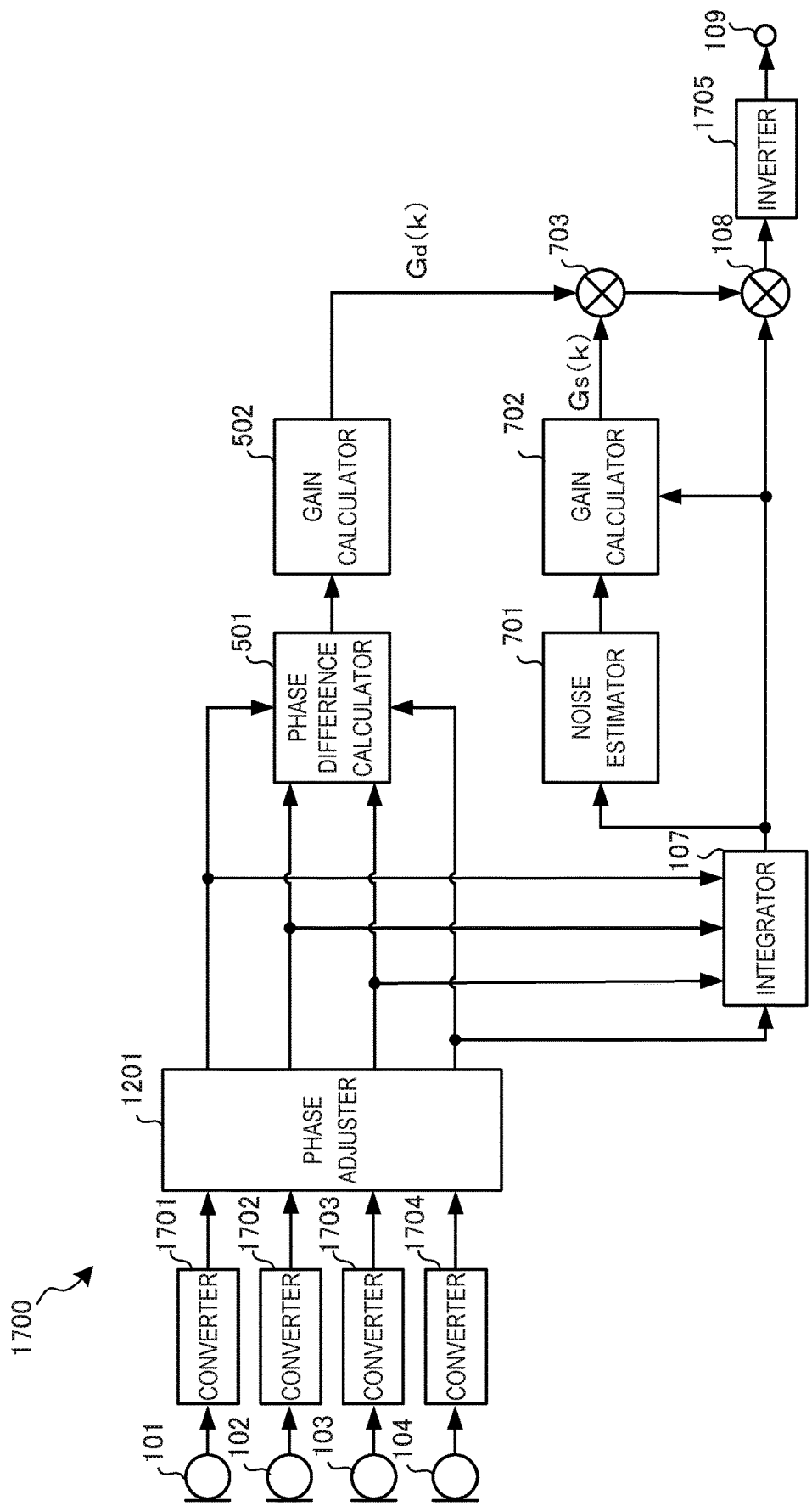
FIG. 17 is a block diagram showing the arrangement of a signal processing apparatus according to the 12th example embodiment of the present invention.

A signal processing apparatus 1700 according to the 12th example embodiment of the present invention will be described with reference to FIG. 17. The signal processing apparatus 1700 is an apparatus for enhancing or suppressing a wideband signal using signals from a plurality of sensors 101 to 104. As shown in FIG. 17, the signal processing apparatus 1700 includes a phase difference calculator 501, a gain calculator 502, an integrator 107, a multiplier 108, a noise estimator 701, a gain calculator 702, a multiplier 703, a phase adjuster 1201, converters 1701 to 1704, and an inverter 1705.

Compared to FIG. 12, the arrangement shown in FIG. 17 is same as that in FIG. 12 except that the converters 1701 to 1704 and the inverter 1705 are added. Only the operations of the converters 1701 to 1704 and inverter 1705 as different components will be described and a description of the remaining components will be omitted.

The converters 1701 to 1704 independently apply conversion to the signals from the plurality of sensors 101 to 104, and output converted signals (frequency domain signals) each containing a plurality of frequency components. All the processes described above are independently performed for data corresponding to each frequency. A practical procedure of applying conversion to a signal and the arrangement of the apparatus are disclosed in patent literature 1 and a description thereof will be omitted.

The phase difference calculator 501, the gain calculator 502, the integrator 107, the multiplier 108, the noise estimator 701, the gain calculator 702, the multiplier 703, and the phase adjuster 1201 are different from those according to the above-described example embodiments, and perform the same processes at a plurality of frequencies for the plurality of converted signals instead of the signals received from the plurality of sensors.

The inverter 1705 inverts an enhanced signal which is the output of the multiplier 108 and is formed from data corresponding to the plurality of frequencies to obtain a time domain signal, and then outputs the obtained signal.

With this arrangement, the signal processing apparatus 1700 can assign, to a wideband signal, directivity (the gain based on the DOA of the signal) independent of the frequency. Therefore, it is possible to effectively enhance or suppress the wideband signal without increasing the size of a sensor array. In addition, since the apparatus has a beam steering function, it is possible to obtain, for a target signal arriving from a direction other than the front, the same effect as that for a target signal arriving from the front.

13th Example Embodiment

Figure 18:
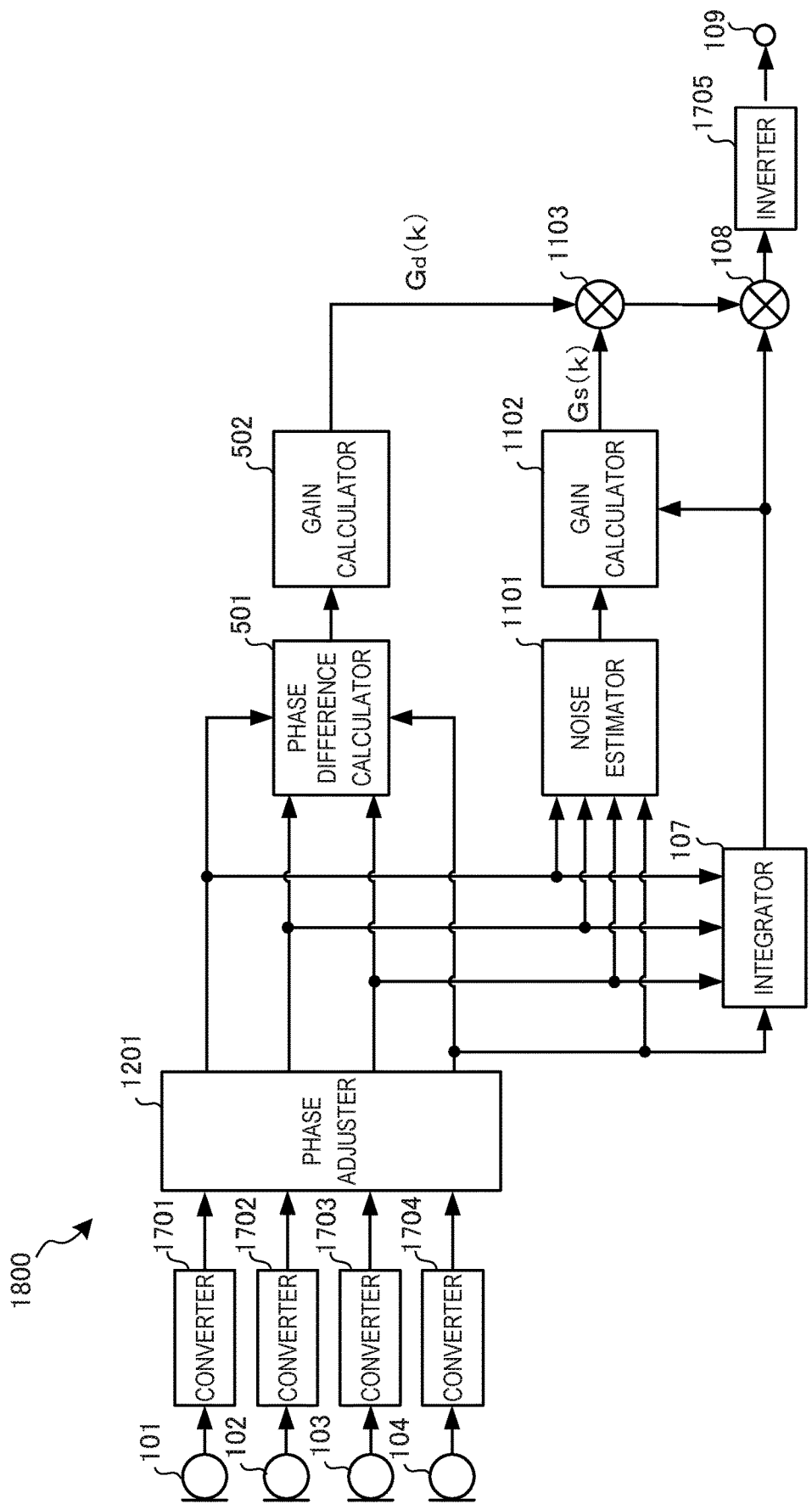
FIG. 18 is a block diagram showing the arrangement of a signal processing apparatus according to the 13th example embodiment of the present invention.

A signal processing apparatus 1800 according to the 13th example embodiment of the present invention will be described with reference to FIG. 18. The signal processing apparatus 1800 is an apparatus for enhancing or suppressing a wideband signal using signals from a plurality of sensors 101 to 104. As shown in FIG. 18, the signal processing apparatus 1800 includes a phase difference calculator 501, a gain calculator 502, an integrator 107, a multiplier 108, a noise estimator 1101, a gain calculator 1102, a multiplier 1103, a phase adjuster 1201, converters 1701 to 1704, and an inverter 1705.

Compared to FIG. 13, the arrangement shown in FIG. 18 is same as that in FIG. 13 except that the converters 1701 to 1704 and the inverter 1705 are added. This is equivalent to the relationship between FIGS. 17 and 12, and has already been explained, and a description thereof will be omitted.

With this arrangement, the signal processing apparatus 1800 can assign, to a wideband signal, directivity (the gain based on the DOA of the signal) independent of the frequency. Therefore, it is possible to effectively enhance or suppress the wideband signal without increasing the size of a sensor array. Since a null beamformer is used to estimate background noise, it is possible to reduce the influence of a directional signal other than background noise, and obtain, as an output, enhanced speech of high quality via correct background noise estimation. In addition, since the apparatus has a beam steering function, it is possible to obtain, for a target signal arriving from a direction other than the front, the same effect as that for a target signal arriving from the front.

14th Example Embodiment

Figure 19:
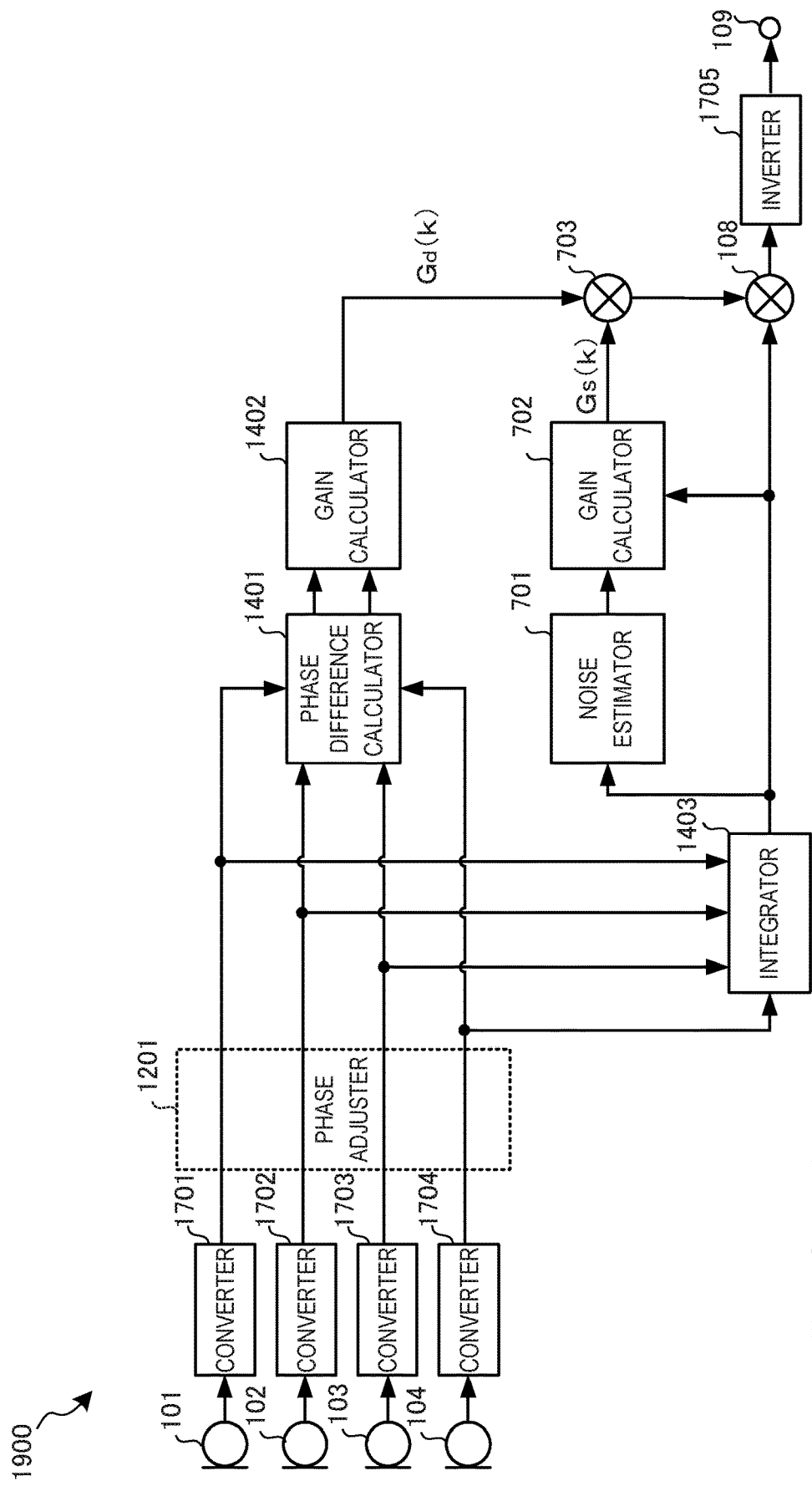
FIG. 19 is a block diagram showing the arrangement of a signal processing apparatus according to the 14th example embodiment of the present invention.

A signal processing apparatus 1900 according to the 14th example embodiment of the present invention will be described with reference to FIG. 19. The signal processing apparatus 1900 is an apparatus for enhancing or suppressing a wideband signal using signals from a plurality of sensors 101 to 104. As shown in FIG. 19, the signal processing apparatus 1900 includes a phase difference calculator 1401, a gain calculator 1402, an integrator 1403, a multiplier 108, a noise estimator 701, a gain calculator 702, a multiplier 703, converters 1701 to 1704, and an inverter 1705.

Compared to FIG. 14, the arrangement shown in FIG. 19 is same as that in FIG. 14 except that the converters 1701 to 1704 and the inverter 1705 are added. This is equivalent to the relationship between FIGS. 17 and 12, and has already been explained, and a description thereof will be omitted.

With this arrangement, the signal processing apparatus 1800 can assign, to a wideband signal, directivity (the gain based on the DOA of the signal) independent of the frequency. Therefore, it is possible to effectively enhance or suppress the wideband signal without increasing the size of a sensor array. In addition, since the apparatus has a beam steering function, it is possible to obtain, for a target signal arriving from a direction other than the front, the same effect as that for a target signal arriving from the front.

15th Example Embodiment

A signal processing apparatus 2000 according to the 15th example embodiment of the present invention will be described with reference to FIG. 20. The signal processing apparatus 2000 is an apparatus for enhancing or suppressing a wideband signal using signals from a plurality of sensors 101 to 104. As shown in FIG. 20, the signal processing apparatus 2000 includes a phase difference calculator 1401, a gain calculator 1402, an integrator 1403, a multiplier 108, a noise estimator 1101, a gain calculator 1102, a multiplier 1103, converters 1701 to 1704, and an inverter 1705.

Compared to FIG. 16, the arrangement shown in FIG. 20 is the same as that of FIG. 16 except that the converters 1701 to 1704 and the inverter 1705 are added. This is equivalent to the relationship between FIGS. 17 and 12, and has already been explained, and a description thereof will be omitted.

With this arrangement, the signal processing apparatus 2000 can assign, to a wideband signal, directivity (the gain based on the DOA of the signal) independent of the frequency. Therefore, it is possible to effectively enhance or suppress the wideband signal without increasing the size of a sensor array. Since the null beamformer is used to estimate background noise, it is possible to reduce the influence of a directional signal other than background noise, and obtain, as an output, enhanced speech of high quality via correct background noise estimation. In addition, since the apparatus has a beam steering function, it is possible to obtain, for a target signal arriving from a direction other than the front, the same effect as that for a target signal arriving from the front.

Figure 21:
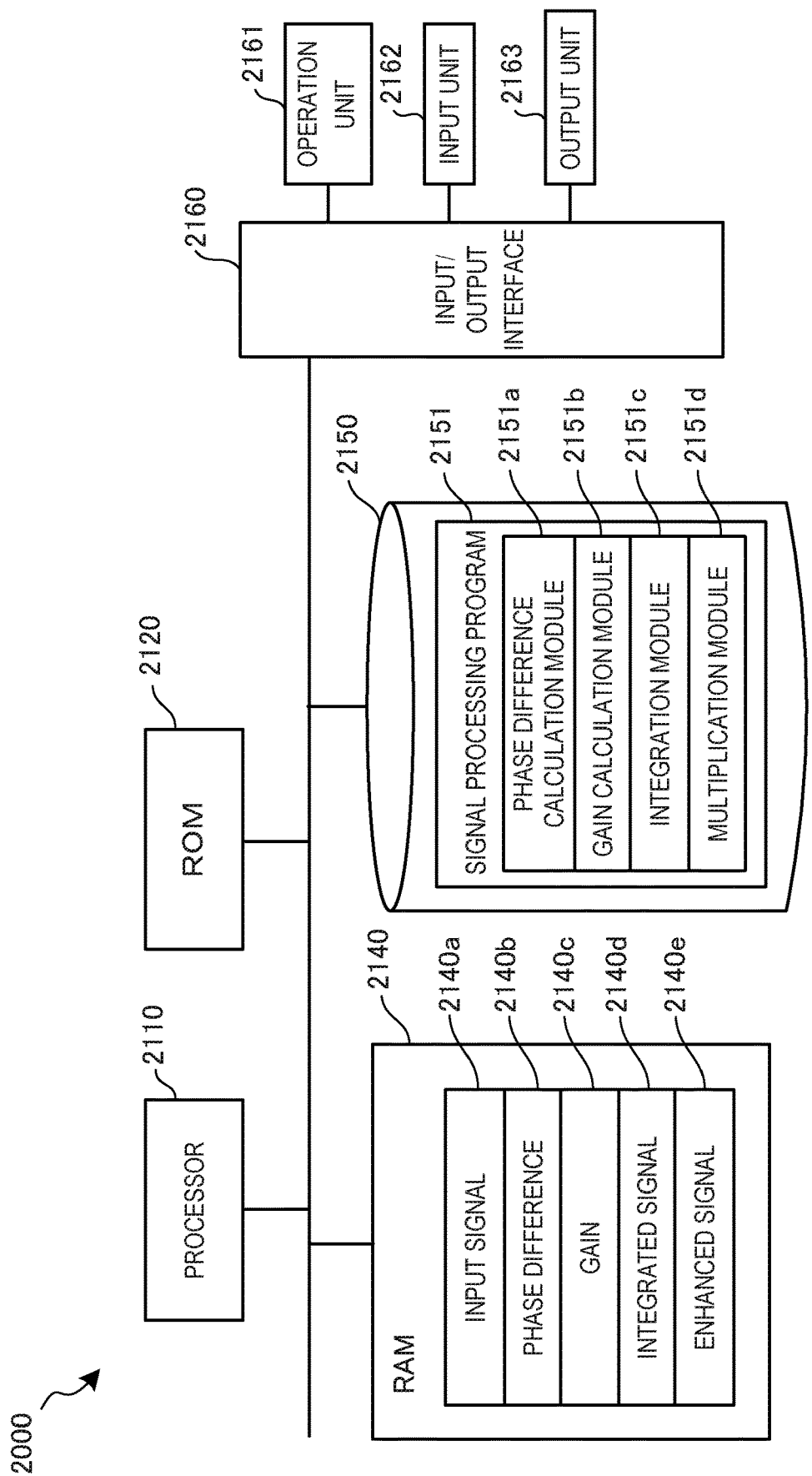
FIG. 21 is a block diagram showing the hardware arrangement of the signal processing apparatus according to the 15th example embodiment of the present invention.

FIG. 21 is a block diagram for explaining a hardware arrangement when the signal processing apparatus 2000 according to the 15th example embodiment is implemented using software. The signal processing apparatuses according to other example embodiments can be implemented by the same hardware.

The signal processing apparatus 2000 includes a processor 2110, a ROM (Read Only Memory) 2120, a RAM (Random Access Memory) 2140, a storage 2150, an input/output interface 2160, an operation unit 2161, an input unit 2162, and an output unit 2163. The processor 2110 is a central processing unit, and controls the overall signal processing apparatus 2000 by executing various programs.

The ROM 2120 stores various parameters as well as a boot program to be executed first by the processor 2110. The RAM 2140 includes an area to store an input signal 2140a, a phase difference 2140b, a gain 2140c, an integrated signal 2140d, an enhanced signal 2140e (output signal), and the like as well as a program load area (not shown).

The storage 2150 stores a signal processing program 2151. The signal processing program 2151 includes a phase difference calculation module 2151a, a gain calculation module 2151b, an integration module 2151c, and a multiplication module 2151d. When the processor 2110 executes the modules included in the signal processing program 2151, the functions of a phase difference calculator 501, gain calculator 502, integrator 107, and multiplier 108 shown in FIG. 5 can be implemented.

The enhanced signal 2140e as an output associated with the signal processing program 2151 executed by the processor 2110 is output from the output unit 2163 via the input/output interface 2160. This can suppress noise or interfering signal contained in the input signal 2140a input from the input unit 2162, and enhance a target signal such as speech.

Figure 22:
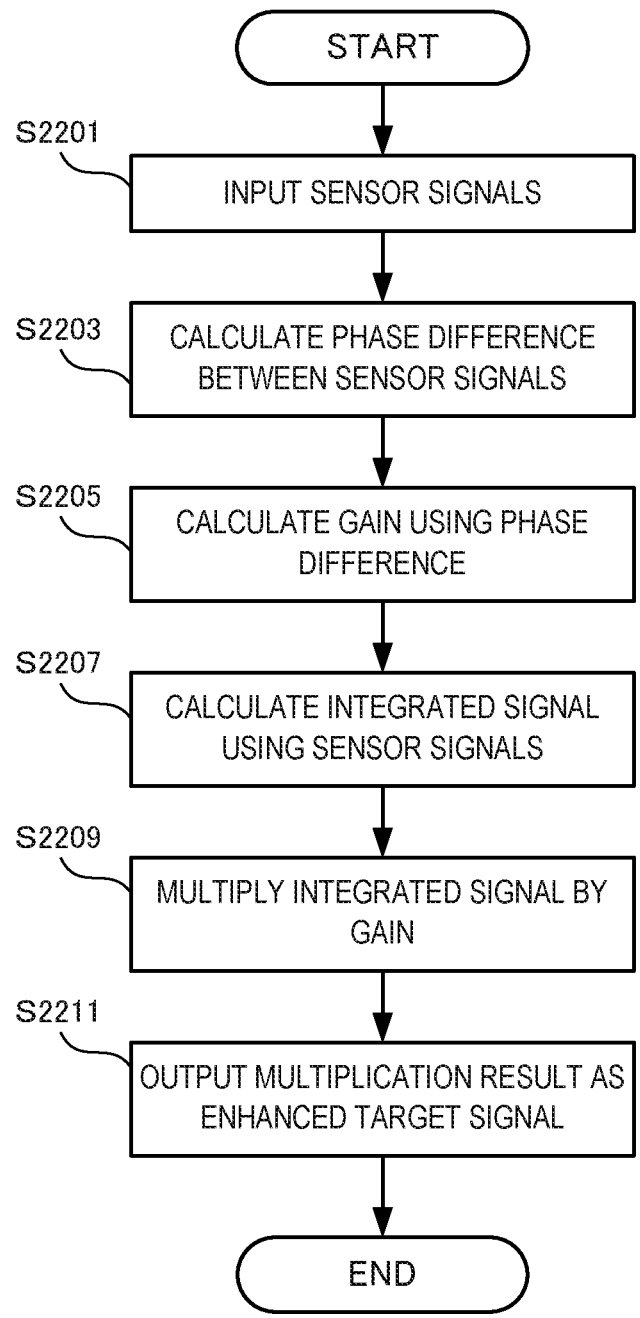
FIG. 22 is a flowchart for explaining the processing procedure of the signal processing apparatus according to the 15th example embodiment of the present invention.

FIG. 22 is a flowchart for explaining a processing procedure of enhancing a target signal such as speech mixed in noise or interfering signal, which is executed by the signal processing program 2151. In step S2201, the plurality of input signals 2140a from the sensors 101 to 104 are supplied to the phase difference calculator. In step S2203, the phase difference calculator 501 calculates the phase difference between the input signals.

In step S2205, processing of calculating a gain corresponding to the phase difference is executed. In step S2207, an integrated signal is generated using the plurality of input signals 2140a from the sensors 101 to 104. In step S2209, the integrated signal is multiplied by the gain to generate an enhanced signal.

Finally, in step S2211, the product of the integrated signal and the gain is output as a signal in which the target signal, that is, the speech is enhanced and the remaining signals are suppressed.

FIG. 22 is the flowchart for explaining the processing procedure when the signal processing apparatus 2000 according to this example embodiment is implemented by software. However, other example embodiments can be implemented in the same manner by appropriately eliminating or adding differences in the respective block diagrams.

According to this example embodiment, with this arrangement, it is possible to assign, to a wideband signal, directivity (the gain based on the DOA of the signal) independent of the frequency. Therefore, it is possible to effectively enhance or suppress the wideband signal without increasing the size of a sensor array.

16th Example Embodiment

An enhanced signal according to this example embodiment is implemented by subtraction instead of multiplication. This is apparent from the fact that when the product of an integrated signal xs(k) and {1−Gd(k)} is obtained, and subtracted from the integrated signal xs(k), resulting in the product of a first gain Gd(k) and the integrated signal xs(k). Assignment of a different gain depending on the DOA of a signal can be implemented by setting a different subtraction amount in accordance with the DOA of the signal. For example, set DOA of signal vs. subtraction amount characteristics in which the subtraction amount in a spectral subtraction is set large in a direction in which the signal is to be suppressed and is set small in a direction in which the signal is to be enhanced are prepared in advance, and used in accordance with the DOA of the signal, thereby implementing the above-described method.

Figure 24:
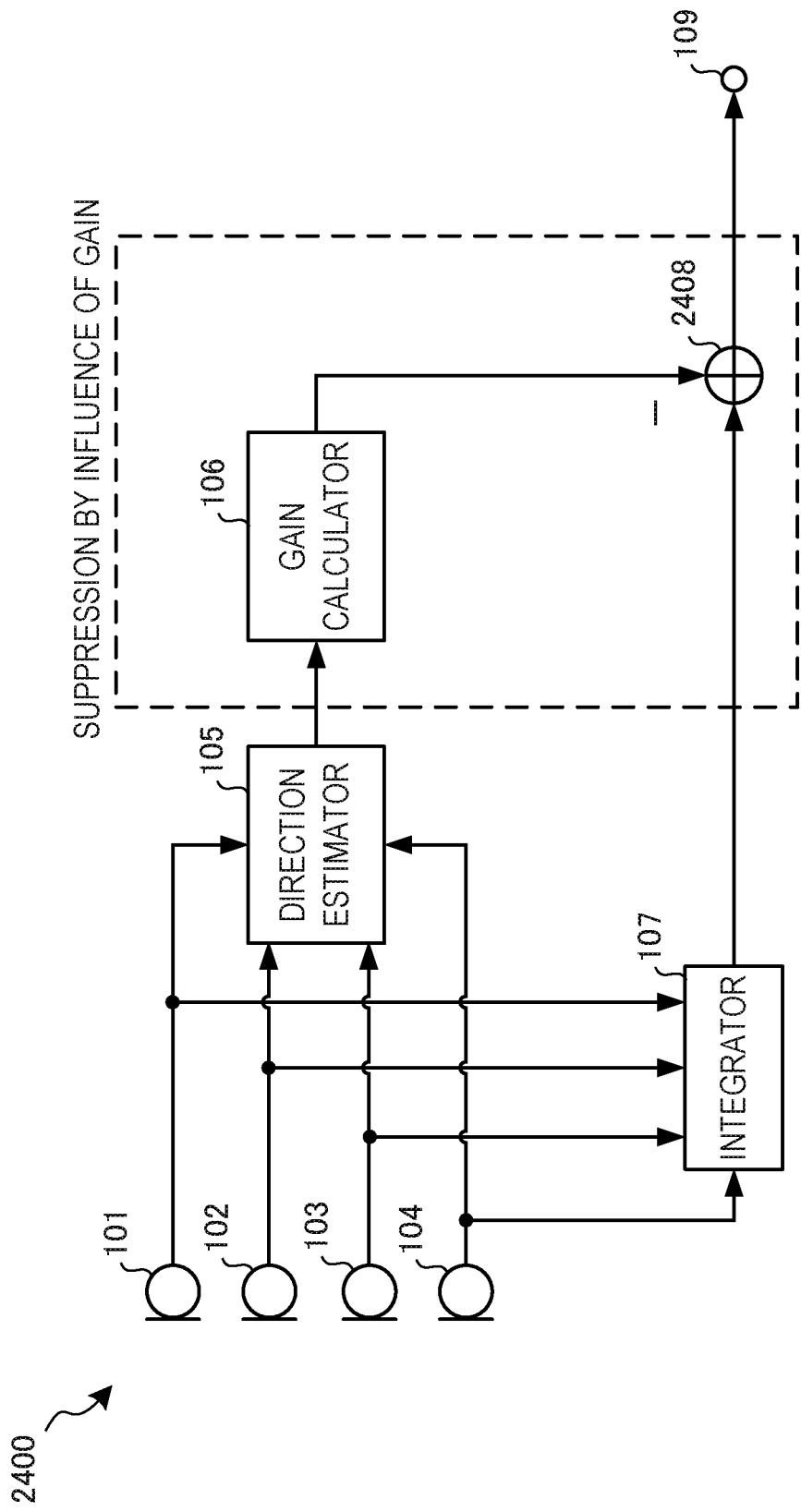
FIG. 24 is a block diagram showing another example of the arrangement of the signal processing apparatus according to the 16th example embodiment of the present invention.

That is, as shown in FIGS. 23 and 24, the essence of this example embodiment is to selectively enhance or suppress the signals by equivalently obtaining the relative delay between the signals or the DOA of the signal using the signals input to a plurality of sensors existing at spatially different positions, and causing a gain corresponding to the relative delay or DOA to modify the input signals or subtracting the ratio between the corresponding input signals from the input signals. As shown in FIG. 24, a subtracter 2408 performs subtraction instead of the multiplier 108. A large gain is set for the relative delay or the DOA in which the signal is to be selectively enhanced, and a small gain is set for the relative delay or the DOA in which the signal is to be suppressed. Representative values of the large and small gains are 1 and 0. However, arbitrary values may be used as long as they are relatively large and small. This is as shown in FIGS. 2 to 4. These gains may be calculated in advance and stored in the storage device, or may be recursively calculated. As an example of constantly performing calculation, there is a method of calculating a gain every time by storing, in the storage device, a function or polynomial representing the relationship between the gain and the phase difference or the DOA of the signal, which is used for calculation. It is also possible to prepare a plurality of relational expressions (functions, polynomials, and the like), and use one of them by switching between them or appropriately use them in combination. By recursively performing calculation, a signal to be enhanced and a signal to be suppressed can be changed in accordance with the characteristics of the input signals, thereby coping with various design requirements. In addition, the memory capacity can be reduced, as compared with a case in which all the characteristics are stored. Instead of calculation, a plurality of gains may be stored in the storage device, and appropriately switched and used. In this case, although the memory capacity increases, the calculation amount can be reduced. Thus, this is useful when for a limit on the calculation amount is imposed.

17th Example Embodiment

Figure 25:
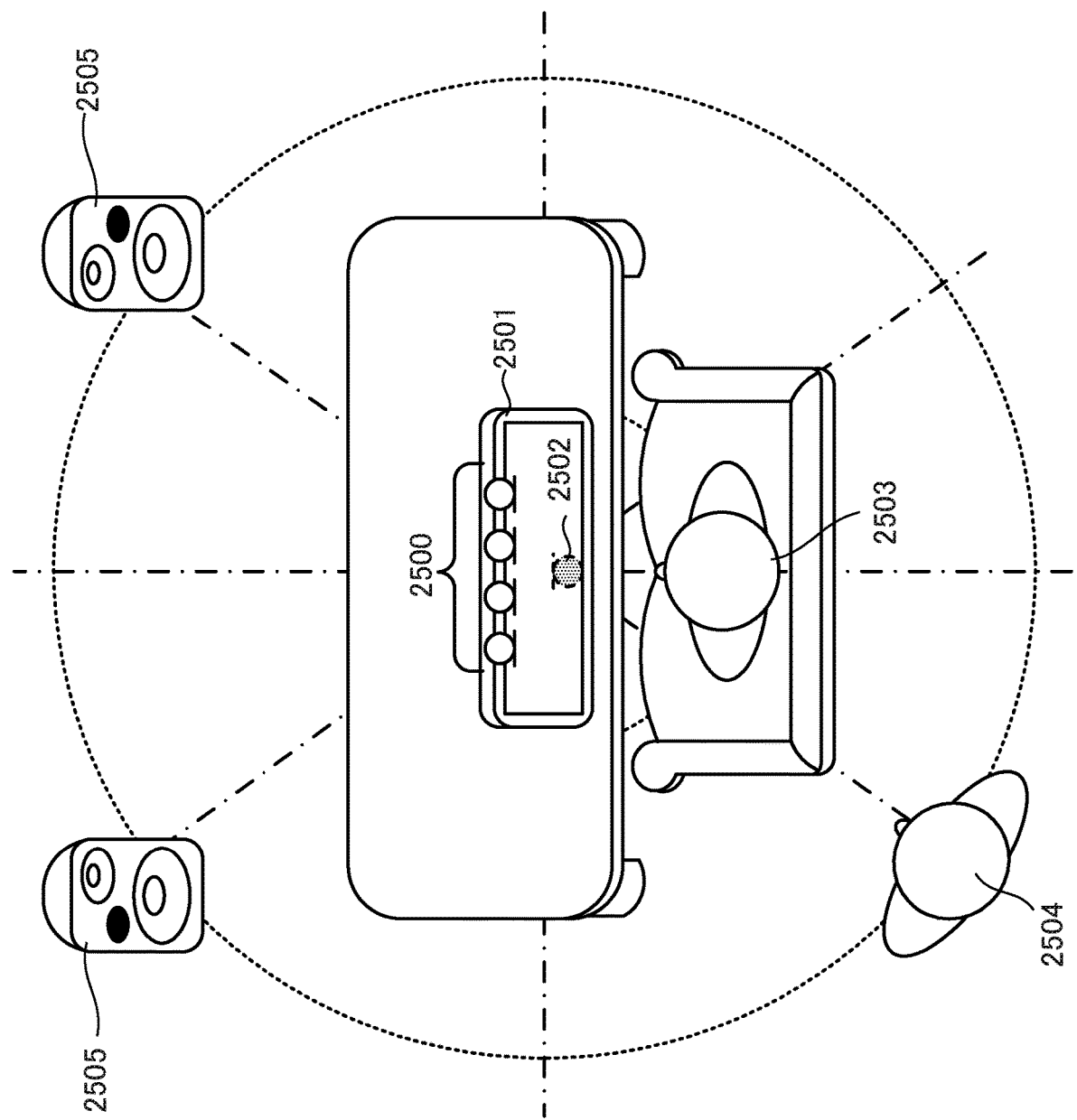
FIG. 25 is a plan view showing an application example of a signal processing apparatus according to the 17th example embodiment of the present invention.

As an application example of the present invention, a case in which a tablet PC placed on a desk is used to perform a video chat or remote communication via a network is considered. FIG. 25 is a top view of an application example of the above.

A sensor array 2500 including four sensors implemented by microphones is arranged in an upper area of the front surface of a tablet PC 2501, and a sensor 2502 is arranged in a lower area of the rear surface of the tablet PC 2501. The sensor 2502 may be arranged in an upper area of the rear surface or on the side surface. By processing acoustic signals acquired by these microphones according to one of the first to eighth example embodiments, it is possible to enhance the voice of a user 2503 sitting on a sofa, and suppress the voice of a person 2504 behind the user and music signals generated by right and left loudspeakers 2505 in front of the user. Consequently, only the speech of the user is obtained as an output, and the output is used for speech communication and speech recognition, thereby implementing comfortable speech communication and achieving a high speech recognition rate.

Figure 26:
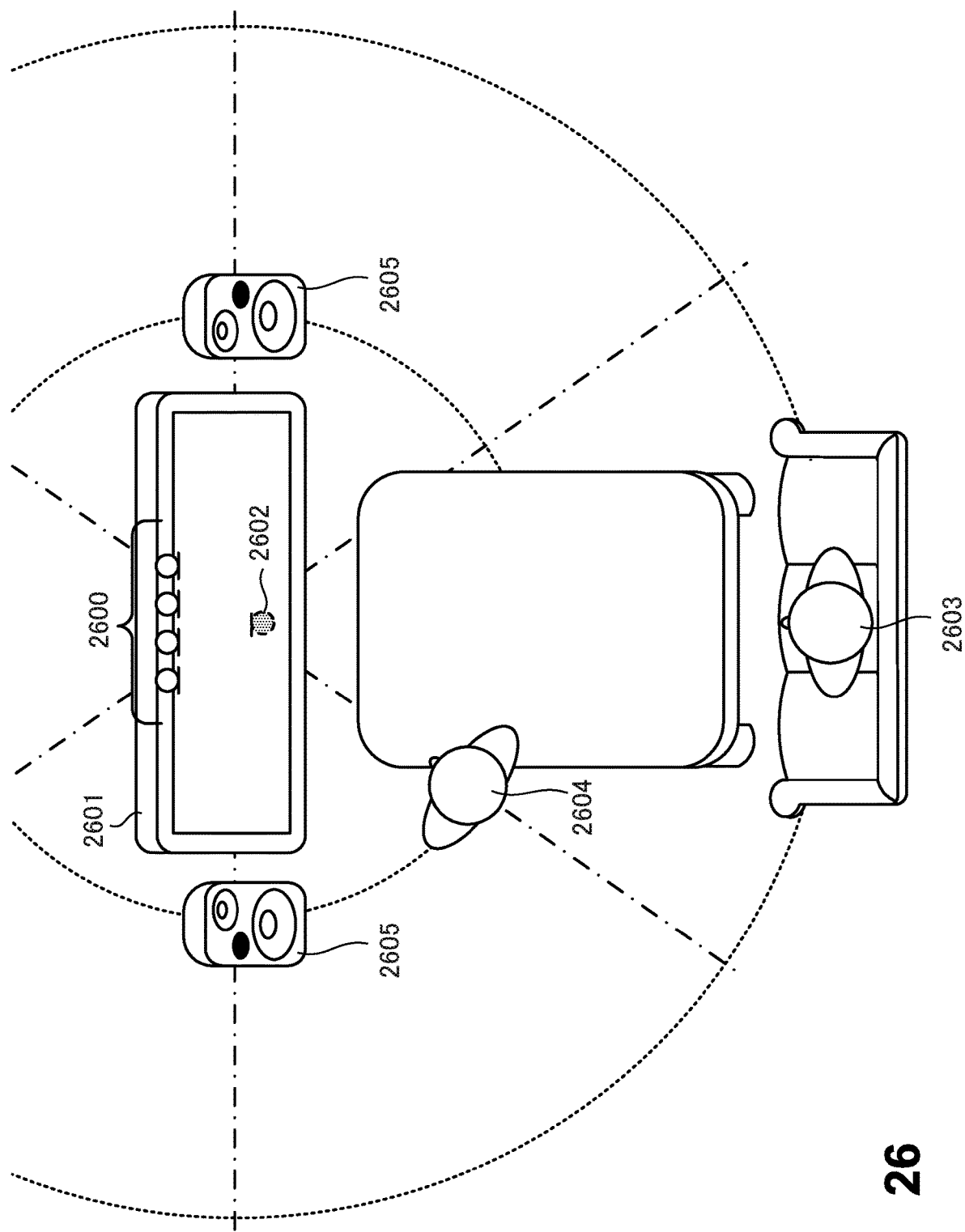
FIG. 26 is a plan view showing another application example of the signal processing apparatus according to the 17th example embodiment of the present invention.

As shown in FIG. 26, a case is also considered in which a television set 2601 placed at a distant position from the user is used to perform a video chat or remote communication via a network. FIG. 26 is a top view of an application example of the above.

A sensor array 2600 including four sensors implemented by microphones is arranged in an upper area of the front surface of the television set 2601, and a sensor 2602 is arranged in a lower area of the rear surface of the television set 2601. The sensor 2602 may be arranged in an upper area of the rear surface or on the side surface. By processing acoustic signals acquired by these microphones according to one of the first to eighth example embodiments, it is possible to enhance the voice of a user 2603 sitting on a sofa, and suppress the voice of a person 2604 off the front of the television set 2601 and music signals generated by right and left loudspeakers 2605 on the two sides of the television set. Consequently, only the speech of the user 2603 is obtained as an output, and the output is used for speech communication and speech recognition, thereby implementing comfortable speech communication and achieving a high speech recognition rate. More specifically, by controlling the television set 2601 by the speech recognition function, the user 2603 can change the channel and volume of the television set 2601 using speech.

Other Example Embodiments

While the present invention has been described with reference to example embodiments, it is to be understood that the invention is not limited to the disclosed example embodiments. The scope of the following claims is to be accorded the broadest interpretation so as to encompass all such modifications and equivalent structures and functions.

The present invention may be applied to a system including a plurality of devices or a single apparatus. The present invention is also applicable even when an information processing program for implementing the functions of the example embodiments is supplied to the system or apparatus directly or from a remote site. Hence, the present invention also incorporates the program installed in a computer to implement the functions of the present invention by the computer, a medium storing the program, and a WWW (World Wide Web) server that causes a user to download the program. In particular, the present invention incorporates a non-transitory computer readable medium storing a program for causing a computer to execute processing steps included in the above-described example embodiments.

Other Expressions of Example Embodiments

Some or all of the above-described example embodiments can also be described as in the following supplementary notes but are not limited to the followings.
(Supplementary Note 1)
There is provided a signal processing apparatus characterized by comprising:
a direction estimator that obtains a direction of arrival of a signal for signals received from a plurality of sensors and each containing a target signal and noise;
a first gain calculator that calculates a first gain using the direction of arrival of the signal;
an integrator that obtains an integrated signal by integrating the signals received from the plurality of sensors; and
a first multiplier that multiplies the first gain by the integrated signal.
(Supplementary Note 2)
There is provided a signal processing apparatus characterized by comprising:
a first phase difference calculator that obtains a phase difference between two signals received from two adjacent sensors among a plurality of sensors each for inputting a signal containing a target signal and noise;
a second gain calculator that calculates a second gain using the phase difference;
an integrator that obtains an integrated signal by integrating signals received from the plurality of sensors; and
a first multiplier that multiplies the second gain by the integrated signal.
(Supplementary Note 3)
There is provided the signal processing apparatus according to supplementary note 2, characterized in that the second gain calculator calculates the second gain dependent on a frequency.
(Supplementary Note 4)
There is provided the signal processing apparatus according to supplementary note 3, characterized in that the second gain calculator calculates the second gain proportional to the frequency.
(Supplementary Note 5)
There is provided the signal processing apparatus according to any one of supplementary notes 2 to 4, characterized by further comprising:
a first noise estimator that obtains a first noise estimated value for noise contained in the integrated signal;
a third gain calculator that calculates, using the first noise estimated value and the integrated signal, a third gain for suppressing the noise contained in the integrated signal; and
a second multiplier that multiplies the second gain by the third gain,
wherein the first multiplier multiplies the integrated signal by an output of the second multiplier.

(Supplementary Note 6)

There is provided the signal processing apparatus according to any one of supplementary notes 2 to 4, characterized by further comprising:

a first noise estimator that obtains a first noise estimated value for noise contained in the integrated signal;

a third gain calculator that calculates, using the first noise estimated value and the integrated signal, a third gain for suppressing the noise contained in the integrated signal; and a third multiplier that multiplies the integrated signal by the third gain, wherein the first multiplier multiplies the second gain by an output of the third multiplier.

(Supplementary Note 7)

There is provided the signal processing apparatus according to any one of supplementary notes 2 to 4, characterized by further comprising:

a first noise estimator that obtains a first noise estimated value for noise contained in the integrated signal;

a third gain calculator that calculates, using the first noise estimated value and the integrated signal, a third gain for suppressing the noise contained in the integrated signal; and a fourth multiplier that multiplies an output of the first multiplier by the third gain.

(Supplementary Note 8)

There is provided the signal processing apparatus according to any one of supplementary notes 2 to 4, characterized by further comprising:

a second noise estimator that obtains a second noise estimated value for noise contained in an output of the first multiplier;

a fourth gain calculator that calculates, using the second noise estimated value and the output of the first multiplier, a fourth gain for suppressing the noise contained in the output of the first multiplier; and a fifth multiplier that multiplies the output of the first multiplier by the fourth gain.

(Supplementary Note 9)

There is provided the signal processing apparatus according to any one of supplementary notes 2 to 4, characterized by further comprising:

a third noise estimator that obtains third noise estimated values for noise components contained in the signals received from the plurality of sensors;

a fifth gain calculator that calculates, using the third noise estimated values and the integrated signal, a fifth gain for suppressing noise contained in the integrated signal; and a fourth multiplier that multiplies the first gain by the fifth gain, wherein the first multiplier multiplies the integrated signal by an output of the fourth multiplier.

(Supplementary Note 10)

There is provided the signal processing apparatus according to any one of supplementary notes 2 to 9, characterized by further comprising:

a phase adjuster that outputs phase-adjusted signals obtained by adjusting phases of the signals received from the plurality of sensors, wherein the phase-adjusted signals are used instead of the signals received from the plurality of sensors.

(Supplementary Note 11)

There is provided the signal processing apparatus according to any one of supplementary notes 2 to 9, characterized by comprising:

instead of the first phase difference calculator, the gain calculator, and the first integrator, a second phase difference calculator that obtains, for the signals received from the plurality of sensors, a phase difference between signals in adjacent sensors and a shift direction of the direction of arrival of the target signal from the front;

a sixth gain calculator that calculates a sixth gain using the phase difference and the shift direction; and an integrator that outputs a phase-adjusted integrated signal obtained by adjusting phases of the signals received from the plurality of sensors and integrating the signals, wherein the sixth gain is used instead of the second gain, and the phase-adjusted integrated signal is used instead of the integrated signal.

(Supplementary Note 12)

There is provided the signal processing apparatus according to any one of supplementary notes 2 to 11, characterized by further comprising:

a plurality of converters that independently apply conversion to the signals received from the plurality of sensors, and obtain converted signals each containing a plurality of frequency components, wherein the same processing is performed at a plurality of frequencies for the plurality of converted signals instead of the signals received from the plurality of sensors.

(Supplementary Note 13)

There is provided a signal processing method characterized by comprising:

obtaining a direction of arrival of a signal for signals received from a plurality of sensors and each containing a target signal and noise;

calculating a first gain using the direction of arrival of the signal;

obtaining an integrated signal by integrating the signals received from the plurality of sensors; and multiplying the first gain by the integrated signal.

(Supplementary Note 14)

There is provided a signal processing method characterized by comprising:

obtaining a phase difference between signals in adjacent sensors for signals received from a plurality of sensors and each containing a target signal and noise;

calculating a second gain using the phase difference;

obtaining an integrated signal by integrating the signals received from the plurality of sensors; and multiplying the second gain by the integrated signal.

(Supplementary Note 15)

There is provided the signal processing method according to supplementary note 14, characterized in that the second gain is dependent on a frequency.

(Supplementary Note 16)

There is provided the signal processing method according to supplementary note 15, characterized in that the second gain is proportional to the frequency.

(Supplementary Note 17)

There is provided a non-transitory computer readable medium storing a signal processing program for causing a computer to execute a method, characterized by comprising:

obtaining a direction of arrival of a signal for signals received from a plurality of sensors and each containing a target signal and noise;

calculating a first gain using the direction of arrival of the signal;

obtaining an integrated signal by integrating the signals received from the plurality of sensors; and multiplying the first gain by the integrated signal.

(Supplementary Note 18)

There is provided a non-transitory computer readable medium storing a signal processing program for causing a computer to execute a method, characterized by comprising:

obtaining a phase difference between signals in adjacent sensors for signals received from a plurality of sensors and each containing a target signal and noise;

calculating a second gain using the phase difference;

obtaining an integrated signal by integrating the signals received from the plurality of sensors; and multiplying the second gain by the integrated signal.

(Supplementary Note 19)

There is provided a non-transitory computer readable medium storing a signal processing program for causing a computer to execute a method, characterized by comprising:

obtaining a phase difference between signals in adjacent sensors for signals received from a plurality of sensors and each containing a target signal and noise;

calculating a second gain dependent on a frequency using the phase difference;

obtaining an integrated signal by integrating the signals received from the plurality of sensors; and multiplying the second gain by the integrated signal.

(Supplementary Note 20)

There is provided a non-transitory computer readable medium storing a signal processing program for causing a computer to execute a method, characterized by comprising:

obtaining a phase difference between signals in adjacent sensors for signals received from a plurality of sensors and each containing a target signal and noise;

calculating a second gain proportional to a frequency by using an offset-removed phase difference obtained by removing an offset in a frequency direction from the phase difference;

obtaining an integrated signal by integrating the signals received from the plurality of sensors; and multiplying the second gain by the integrated signal.

(Supplementary Note 21)

There is provided a signal processing method characterized by comprising:

obtaining a direction of arrival of a signal using signals input to a plurality of sensors existing at spatially different positions; and selectively enhancing or suppressing a signal by causing a gain corresponding to the direction of arrival to influence the input signals or subtracting a ratio between the corresponding input signals from the input signals, wherein a large gain is set for the direction of arrival in which the signal is to be selectively enhanced and a small gain is set for the direction of arrival in which the signal is to be suppressed.

This application claims the benefit of Japanese Patent Application No. 2014-228497, filed on Nov. 10, 2014, which is hereby incorporated by reference in its entirety.

The invention claimed is:

1. A signal processing apparatus comprising:
 a first phase difference calculator that obtains phase differences at a plurality of frequencies between two signals received from two adjacent sensors among a plurality of sensors each for inputting a signal containing a target signal and noise;
 a second gain calculator that calculates a second gain using the phase differences and the plurality of frequencies;
 an integrator that obtains an integrated signal by integrating signals received from the plurality of sensors; and
 a first multiplier that multiplies the second gain by the integrated signal,
 wherein the first phase difference calculator obtains, as each of the phase differences, an offset-removed phase reference by removing an offset in a frequency direction from each of the phase differences.

2. The signal processing apparatus according to claim 1, wherein said second gain calculator calculates the second gain dependent on a frequency of the plurality of frequencies.

3. The signal processing apparatus according to claim 2, wherein said second gain calculator calculates the second gain using the phase differences proportional to the frequency of the plurality of frequencies.

4. The signal processing apparatus according to claim 1, further comprising:
 a first noise estimator that obtains a first noise estimated value for noise contained in the integrated signal;
 a third gain calculator that calculates, using the first noise estimated value and the integrated signal, a third gain for suppressing the noise contained in the integrated signal; and
 a second multiplier that multiplies the second gain by the third gain,
 wherein said first multiplier multiplies the integrated signal by an output of said second multiplier.

5. The signal processing apparatus according to claim 1, further comprising:
 a first noise estimator that obtains a first noise estimated value for noise contained in the integrated signal;
 a third gain calculator that calculates, using the first noise estimated value and the integrated signal, a third gain for suppressing the noise contained in the integrated signal; and
 a third multiplier that multiplies the integrated signal by the third gain,
 wherein said first multiplier multiplies the second gain by an output of said third multiplier.

6. The signal processing apparatus according to claim 1, further comprising:
 a first noise estimator that obtains a first noise estimated value for noise contained in the integrated signal;
 a third gain calculator that calculates, using the first noise estimated value and the integrated signal, a third gain for suppressing the noise contained in the integrated signal; and
 a fourth multiplier that multiplies an output of said first multiplier by the third gain.

7. The signal processing apparatus according to claim 1, further comprising:
 a second noise estimator that obtains a second noise estimated value for noise contained in an output of said first multiplier;
 a fourth gain calculator that calculates, using the second noise estimated value and the output of said first multiplier, a fourth gain for suppressing the noise contained in the output of said first multiplier; and
 a fifth multiplier that multiplies the output of said first multiplier by the fourth gain.

8. The signal processing apparatus according to claim 1, further comprising:
 a third noise estimator that obtains third noise estimated values for noise components contained in the signals received from the plurality of sensors;
 a fifth gain calculator that calculates, using the third noise estimated values and the integrated signal, a fifth gain for suppressing noise contained in the integrated signal; and
 a fourth multiplier that multiplies the first gain by the fifth gain, wherein the first multiplier multiplies the integrated signal by an output of the fourth multiplier.

9. The signal processing apparatus according to claim 1, further comprising:
a phase adjuster that outputs phase-adjusted signals obtained by adjusting phases of the signals received from the plurality of sensors,
wherein the phase-adjusted signals are used instead of the signals received from the plurality of sensors.

10. The signal processing apparatus according to claim 1, comprising:
instead of the first phase difference calculator, the gain calculator, and the first integrator,
a second phase difference calculator that obtains, for the signals received from the plurality of sensors, a phase difference between signals in adjacent sensors and a shift direction of the direction of arrival of the target signal from the front;
a sixth gain calculator that calculates a sixth gain using the phase difference and the shift direction; and
an integrator that outputs a phase-adjusted integrated signal obtained by adjusting phases of the signals received from the plurality of sensors and integrating the signals,
wherein the sixth gain is used instead of the second gain, and the phase-adjusted integrated signal is used instead of the integrated signal.

11. The signal processing apparatus according to claim 1, further comprising:
a plurality of converters that independently apply conversion to the signals received from the plurality of sensors, and obtain converted signals each containing a plurality of frequency components,
wherein the same processing is performed at a plurality of frequencies for the plurality of converted signals instead of the signals received from the plurality of sensors.

12. The signal processing apparatus according to claim 1, wherein the second gain calculator comprises a storage in which the second gain is stored associated with the phase differences and the plurality of frequencies.

13. The signal processing apparatus according to claim 1, wherein the first phase difference calculator obtains each of the phase differences based on a statistical value of a plurality of values calculated using a plurality of sets of adjacent sensors.

14. The signal processing apparatus according to claim 13, wherein the statistical value includes one of an average value and a median value.

15. The signal processing apparatus according to claim 13, wherein the statistical value includes one of a maximum value and a minimum value.

16. A signal processing apparatus comprising:
a first phase difference calculator that obtains phase differences at a plurality of frequencies between two signals received from two adjacent sensors among a plurality of sensors each for inputting a signal containing a target signal and noise;
a second gain calculator that calculates a second gain using the phase differences and the plurality of frequencies;
an integrator that obtains an integrated signal by integrating signals received from the plurality of sensors; and
a first multiplier that multiplies the second gain by the integrated signal,
wherein the first phase difference calculator obtains each of the phase differences by dividing a phase difference between two signals from two sensors, of the plurality of sensors, between which M−1 sensors, of the plurality of sensors, exist, by M where M is an integer greater than 1.

17. The signal processing apparatus according to claim 16, wherein said second gain calculator calculates the second gain dependent on a frequency.

18. The signal processing apparatus according to claim 17, wherein said second gain calculator calculates the second gain proportional to the frequency.

19. The signal processing apparatus according to claim 16, wherein the second gain calculator comprises a storage in which the second gain is stored and associated with the phase references and the plurality of frequencies.

* * * * *